(12) United States Patent
Wakamatsu

(10) Patent No.: US 9,912,868 B2
(45) Date of Patent: Mar. 6, 2018

(54) IMAGE-BLUR CORRECTION APPARATUS, TILT CORRECTION APPARATUS, METHOD OF CONTROLLING IMAGE-BLUR CORRECTION APPARATUS, AND METHOD OF CONTROLLING TILT CORRECTION APPARATUS

(71) Applicant: CANON KABUSHIKI KAISHA, Tokyo (JP)

(72) Inventor: Nobushige Wakamatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/264,072

(22) Filed: Sep. 13, 2016

(65) Prior Publication Data

US 2017/0078577 A1 Mar. 16, 2017

(30) Foreign Application Priority Data

Sep. 15, 2015 (JP) ................................ 2015-181487
Jun. 29, 2016 (JP) ................................ 2016-128844

(51) Int. Cl.
*H04N 5/232* (2006.01)

(52) U.S. Cl.
CPC ..... *H04N 5/23287* (2013.01); *H04N 5/23216* (2013.01); *H04N 5/23267* (2013.01); *H04N 5/23274* (2013.01); *G03B 2217/005* (2013.01); *H04N 5/23258* (2013.01)

(58) Field of Classification Search
CPC .......... H04N 5/23258; H04N 5/23248; H04N 5/23267; H04N 5/23254; H04N 5/2329; H04N 5/3532; H04N 5/23274; H04N 5/23264; H04N 5/23251; H04N 5/23293; G03B 2217/005; G06T 3/40
See application file for complete search history.

(56) References Cited

U.S. PATENT DOCUMENTS

| | | | | |
|---|---|---|---|---|
| 6,982,746 B1 * | 1/2006 | Kawahara | .......... | H04N 5/23248 348/208.1 |
| 7,432,953 B2 * | 10/2008 | Washisu | ............... | H04N 5/2253 348/208.11 |
| 7,509,039 B2 * | 3/2009 | Suda | .................. | H04N 5/23248 348/208.1 |

(Continued)

FOREIGN PATENT DOCUMENTS

JP 07-095466 A 4/1995
JP 2006-186481 A 7/2006

*Primary Examiner* — Michael Osinski
(74) *Attorney, Agent, or Firm* — Cowan, Liebowitz & Latman, P.C.

(57) ABSTRACT

A tilt correction apparatus includes a manipulation unit configured to designate a level of an effect of first tilt correction of an imaging apparatus having an optical axis as a rotary axis and a level of an effect of second tilt correction of the imaging apparatus having an axis orthogonal to the optical axis as a rotary axis, an electronic correction unit configured to execute at least one of the first tilt correction and the second tilt correction by moving an image clipping range set within an imaging screen, and a calculation unit configured to vary a ratio of a first tilt-correctable range and a ratio of a second tilt-correctable range from the electronic correction unit according to the level of the effect of the first tilt correction and the level of the effect of the second tilt correction.

12 Claims, 26 Drawing Sheets

(56) References Cited

U.S. PATENT DOCUMENTS

| | | | |
|---|---|---|---|
| 7,689,108 B2 * | 3/2010 | Hosoda | H04N 5/23248 348/208.5 |
| 7,738,728 B2 | 6/2010 | Kurata et al. | |
| 7,859,568 B2 * | 12/2010 | Shimano | G06T 3/608 348/208.6 |
| 8,792,009 B2 * | 7/2014 | Oota | H04N 5/144 348/208.1 |
| 9,013,585 B2 * | 4/2015 | Murakami | H04N 5/23287 348/208.2 |
| 9,124,807 B2 * | 9/2015 | Tsubaki | H04N 5/23274 |
| 9,285,460 B2 * | 3/2016 | Haglund | G09B 9/48 |
| 9,374,531 B2 * | 6/2016 | Wakamatsu | H04N 5/23267 |
| 9,538,082 B2 * | 1/2017 | Watanabe | H04N 5/23267 |
| 9,635,258 B2 * | 4/2017 | Ikeda | H04N 5/23264 |
| 9,639,913 B2 * | 5/2017 | Satoh | G06T 3/0056 |
| 2004/0218056 A1 * | 11/2004 | Nomura | H04N 5/23248 348/208.6 |
| 2007/0223900 A1 * | 9/2007 | Kobayashi | H04N 5/23232 396/50 |
| 2009/0225174 A1 * | 9/2009 | Handa | H04N 5/23248 348/208.3 |
| 2010/0295956 A1 * | 11/2010 | Goto | H04N 5/23248 348/208.6 |
| 2011/0157381 A1 * | 6/2011 | Miyasako | G02B 27/646 348/208.5 |
| 2012/0320227 A1 * | 12/2012 | Tsuchida | H04N 5/23274 348/208.99 |
| 2013/0135487 A1 * | 5/2013 | Ueda | H04N 5/23251 348/208.4 |
| 2013/0169833 A1 * | 7/2013 | Omori | H04N 5/23267 348/208.6 |
| 2014/0063279 A1 * | 3/2014 | Ogura | H04N 5/23209 348/222.1 |
| 2014/0078327 A1 * | 3/2014 | Miyasako | H04N 5/23258 348/208.6 |
| 2014/0300765 A1 * | 10/2014 | Takao | H04N 5/23274 348/208.1 |
| 2014/0313354 A1 * | 10/2014 | Kusanagi | H04N 5/23267 348/208.6 |
| 2015/0123990 A1 * | 5/2015 | Satoh | H04N 5/23248 345/625 |
| 2015/0130963 A1 * | 5/2015 | Tanaka | H04N 5/23258 348/222.1 |
| 2016/0006923 A1 * | 1/2016 | Imamura | H04N 5/23209 348/208.11 |
| 2016/0182828 A1 * | 6/2016 | Ikeda | H04N 5/23245 348/208.5 |
| 2016/0255273 A1 * | 9/2016 | Wakamatsu | H04N 5/23248 348/208.99 |
| 2017/0013198 A1 * | 1/2017 | Wada | G03B 5/00 |

* cited by examiner

FIG. 14

| SHAKE CORRECTION | | ON | OFF |
|---|---|---|---|
| TILT CORRECTION | HORIZONTAL | ON | OFF |
| | FLAPPING | ON | OFF |

FIG. 15

| SHAKE CORRECTION | ON | | OFF |
|---|---|---|---|
| EFFECT | REALISM PRIORITY | \| | SHAKE STOP PRIORITY |

| TILT CORRECTION | HORIZONTAL | ON | OFF |
|---|---|---|---|
| | FLAPPING | ON | OFF |
| EFFECT | LOW | \| | HIGH |

FIG. 16

| SHAKE CORRECTION | | REALISM PRIORITY | | | | | SHAKE STOP PRIORITY |
|---|---|---|---|---|---|---|---|
| TRANSLATION CORRECTION | EFFECT | 1 | ②  | 3 | 4 | 5 | 6 | 7 |
| ROLL CORRECTION | EFFECT | 1 | ② | 3 | 4 | 5 | 6 | 7 |
| TRANSLATION ROLLING SHUTTER DISTORTION CORRECTION | EFFECT | 2 | ② | 2 | 2 | 2 | 2 | 2 |
| ROLL ROLLING SHUTTER DISTORTION CORRECTION | EFFECT | 2 | ② | 2 | 2 | 2 | 2 | 2 |

| TILT CORRECTION | | LOW | | | | | HIGH |
|---|---|---|---|---|---|---|---|
| TRANSLATION CORRECTION | EFFECT | 1 | 2 | 3 | 4 | 5 | ⑥ | 7 |
| ROLL CORRECTION | EFFECT | 1 | 2 | 3 | 4 | 5 | ⑥ | 7 |
| TRANSLATION ROLLING SHUTTER DISTORTION CORRECTION | EFFECT | 2 | 2 | 2 | 2 | 2 | ② | 2 |
| ROLL ROLLING SHUTTER DISTORTION CORRECTION | EFFECT | 2 | 2 | 2 | 2 | 2 | ② | 2 |

| | | | |
|---|---|---|---|
| SHAKE CORRECTION | REALISM PRIORITY | I | SHAKE STOP PRIORITY |
| LIMIT OF EXPOSURE TIME | LOW-SPEED SIDE ← | | → HIGH-SPEED SIDE |

FIG. 23A

| SHAKE CORRECTION | | REALISM PRIORITY | | | | | | SHAKE STOP PRIORITY |
|---|---|---|---|---|---|---|---|---|
| TRANSLATION CORRECTION | EFFECT | 0 | 0 | 0 | 1 | 2 | 3 | 4 |
| ROLL CORRECTION | EFFECT | 0 | 0 | 0 | 1 | 2 | 3 | 4 |
| TRANSLATION RS DISTORTION CORRECTION | EFFECT | 7 | 7 | 7 | 6 | 5 | 4 | 3 |
| ROLL RS DISTORTION CORRECTION | EFFECT | 7 | 7 | 7 | 6 | 5 | 4 | 3 |

| | TILT CORRECTION | LOW | | | | | | HIGH |
|---|---|---|---|---|---|---|---|---|
| TRANSLATION CORRECTION | EFFECT | 1 | 2 | 3 | 4 | 5 | 6 | 7 |
| ROLL CORRECTION | EFFECT | 1 | 2 | 3 | 4 | 5 | 6 | 7 |
| TRANSLATION RS DISTORTION CORRECTION | EFFECT | 2 | 2 | 2 | 2 | 2 | 2 | 2 |
| ROLL RS DISTORTION CORRECTION | EFFECT | 2 | 2 | 2 | 2 | 2 | 2 | 2 |

FIG. 23B

| | SHAKE CORRECTION | REALISM PRIORITY | | | | | | SHAKE STOP PRIORITY |
|---|---|---|---|---|---|---|---|---|
| MECHANICAL TRANSLATION CORRECTION EFFECT | EFFECT | 1 | 2 | 3 | 4 | 5 | 6 | 7 |
| MECHANICAL ROLL SHAKE CORRECTION EFFECT | EFFECT | 1 | 2 | 3 | 4 | 5 | 6 | 7 |

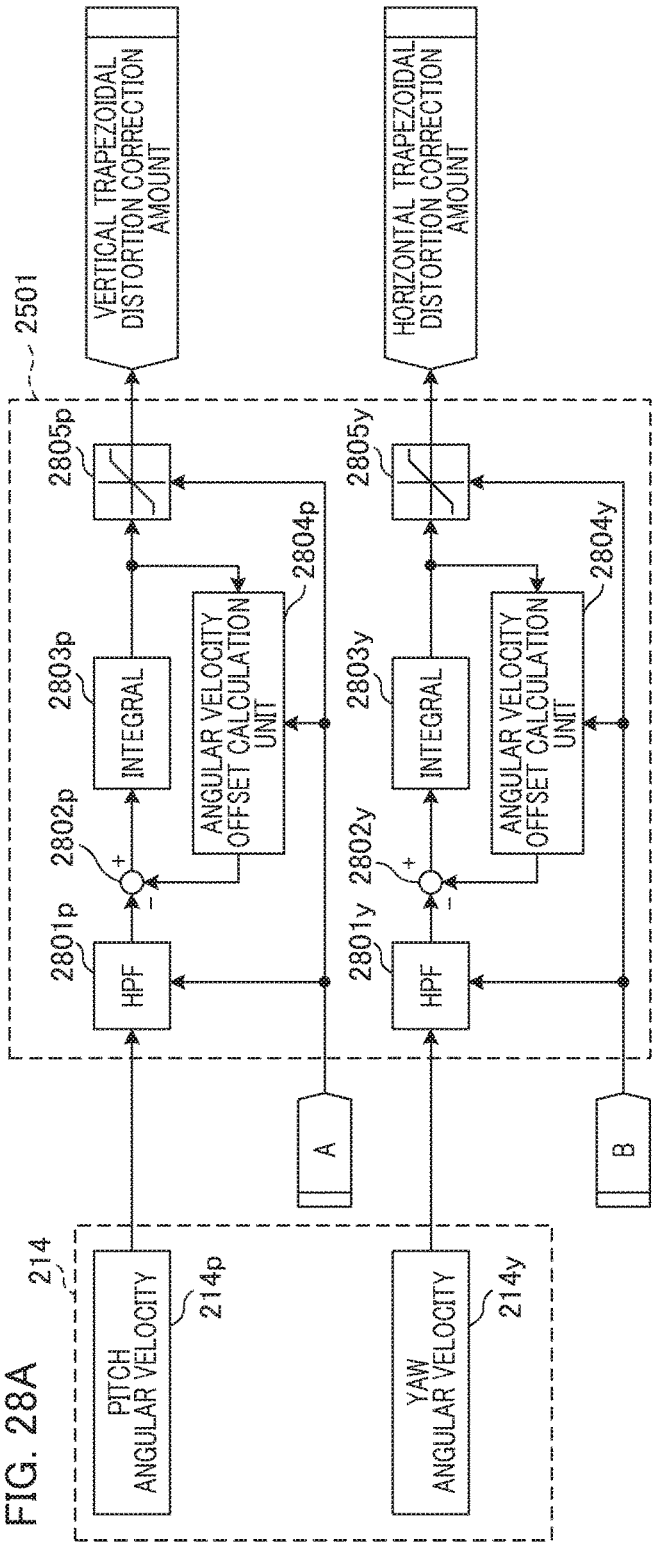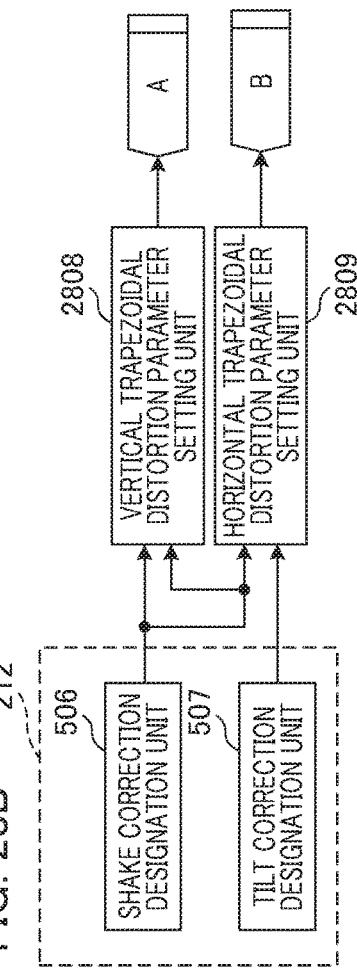
FIG. 28A
FIG. 28B

IMAGE-BLUR CORRECTION APPARATUS, TILT CORRECTION APPARATUS, METHOD OF CONTROLLING IMAGE-BLUR CORRECTION APPARATUS, AND METHOD OF CONTROLLING TILT CORRECTION APPARATUS

BACKGROUND OF THE INVENTION

Field of the Invention

The present invention relates to technology for correcting the image blur or tilt of an image due to shaking.

Description of the Related Art

An image-blur correction apparatus mounted on an imaging apparatus suppresses image blur of an image on an image plane, for example, by moving a lens or an imaging device on a plane perpendicular to an optical axis according to an amount of camera shake. Alternatively, it is possible to suppress image blur caused by roll rotation by rotating the imaging device around an optical axis. Also, there is a tilt correction apparatus for detecting a tilt angle of an apparatus with high precision by detecting the direction of gravity using an acceleration meter or the like and automatically correcting tilt of the imaging apparatus for a horizontal plane perpendicular to the direction of gravity. In the capturing of a moving image, the influence of shake or tilt is reduced by changing a clipping position of each photographing frame output by the imaging device through electronic correction. The imaging apparatus disclosed in Japanese Patent Laid-Open No. H7-95466 corrects tilt around the optical axis for the horizontal plane perpendicular to the direction of gravity of the imaging device by detecting tilt of the imaging apparatus and automatically correcting the tilt in a captured image.

Also, there area charge coupled device (CCD) sensor and a complementary metal oxide semiconductor (CMOS) of low power consumption as the imaging device, and the CCD and the CMOS are different in terms of an exposure scheme during photographing. While exposure timings and exposure periods of all images of the imaging device are the same when one image is captured in the CCD sensor, a difference between exposure periods occurs in the CMOS sensor because the opening/closing timing of a shutter is different for every line constituting the imaging device. In a driving scheme of the CMOS sensor called the rolling shutter scheme, an object image moves for every line of the imaging device, for example, due to movement of an object during exposure or camera shake by a photographer grasping an imaging apparatus during exposure. Thus, a phenomenon in which distortion is caused in a captured image occurs and is referred to as a "rolling shutter problem" or a "focal plane phenomenon." The rolling shutter distortion is known to be more remarkable in moving-image capturing in which no mechanical shutter is used than in still-image capturing in which a mechanical shutter is used.

In Japanese Patent Laid-Open No. 2006-186481, technology for correcting distortion caused by camera shake by the photographer in relation to correction of rolling shutter distortion is disclosed. An apparatus of Japanese Patent Laid-Open No. 2006-186481 changes a read position for every line of the imaging device to correct the camera shake of the horizontal direction and changes a position of a read line in the vertical direction to correct the camera shake in the vertical direction.

In the case of the imaging apparatus which performs shake correction, tilt correction, or the rolling shutter distortion correction, it is necessary to increase each correction range to increase each correction effect if the amplitude of the shake increases due to the transfer of vibration to the imaging apparatus according to the shake of the body of the user, such as when photographing is performed while walking.

There are optical correction and electronic correction as types of image-blur correction. The optical correction is optical-axis shift correction for moving a part of a lens of an imaging optical system or an imaging device in a shift direction, correction of rotationally driving a barrel in which the lens and the imaging device are integrated on the basis of a shake angle, or the like. In the case of mechanical correction, it is necessary to perform correction in a translation direction (a vertical direction and a horizontal direction of an image) and correction of a roll direction within a limited movable range. On the other hand, in the electronic correction, the correction is performed through image processing by changing a clipping position of each photographing frame. In this case, it is possible to reduce a clipping range for an original image and enlarge a correction range by allocating a surplus of an image to correction ranges of translation, roll, and rolling shutter distortion. However, when an angle of view of clipping of the image is excessively reduced, there is a possibility of image deterioration occurring due to degradation of resolution or an event of reduction of an angle of view of photographing after clipping.

SUMMARY OF THE INVENTION

The present invention is directed to correction of image blur or tilt of an image within a predetermined correction range on the basis of a setting of a correction effect optically designated by a user in an image-blur correction apparatus for correcting image blur of an image or a tilt correction apparatus for correcting tilt of an image.

An apparatus of an embodiment of the present invention is a tilt correction apparatus including: a manipulation unit configured to designate a level of an effect of first tilt correction of an imaging apparatus having an optical axis as a rotary axis and a level of an effect of second tilt correction of the imaging apparatus having an axis orthogonal to the optical axis as a rotary axis; an electronic correction unit configured to execute at least one of the first tilt correction and the second tilt correction by moving an image clipping range set within an imaging screen; and a calculation unit configured to vary a ratio of a first tilt-correctable range and a ratio of a second tilt-correctable range from the electronic correction unit according to the level of the effect of the first tilt correction and the level of the effect of the second tilt correction.

Also, an apparatus of an embodiment of the present invention is an image-blur correction apparatus including: a manipulation unit configured to designate a level of an effect of image-blur correction and a level of an effect of first tilt correction of an imaging apparatus having an optical axis as a rotary axis; an electronic correction unit configured to execute at least one of the image-blur correction and the first tilt correction by moving an image clipping range set within an imaging screen; and a calculation unit configured to vary a ratio of an image-blur-correctable range and a ratio of a first tilt-correctable range from the electronic correction unit according to the level of the effect of the image-blur correction and the level of the effect of the first tilt correction.

Further features of the present invention will become apparent from the following description of exemplary embodiments with reference to the attached drawings.

BRIEF DESCRIPTION OF THE DRAWINGS

FIG. 14 is a diagram illustrating the designation of mode switching in the first embodiment.

FIG. 15 is a diagram illustrating the designation of mode switching in a second embodiment.

FIG. 16 is a diagram illustrating the designation of a correction effect at the time of mode switching in the second embodiment.

FIGS. 23A and 23B are diagrams illustrating the designations of correction effects at the time of mode switching in the third embodiment.

FIGS. 28A and 28B are block diagrams illustrating a trapezoidal distortion correction amount calculation unit of the fourth embodiment.

DESCRIPTION OF THE EMBODIMENTS

Embodiments of the present invention will be described in detail with reference to the accompanying drawings. The present invention is not limited to the application to a digital camera, a digital video camera, or the like and can be applied to an imaging apparatus such as a portable phone, a monitoring camera or, a Web camera.

First Embodiment

Figure 1:
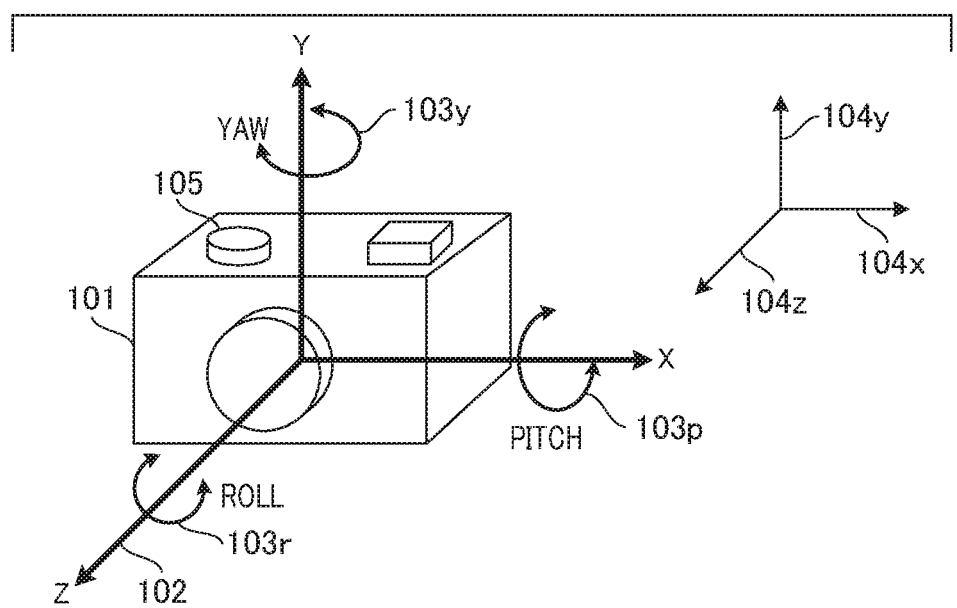
FIG. 1 is a schematic diagram illustrating shake of an imaging apparatus according to an embodiment of the present invention.

FIG. 1 is a schematic diagram illustrating a shake direction of an imaging apparatus. A shake correction system mounted on a camera 101 performs image-blur corrections for angles of pitch, yaw, roll indicated by arrows 103p, 103y, and 103r with respect to an optical axis 102. In a three-dimensional orthogonal coordinate system, a z-axis direction is defined as an optical-axis direction, a first axis orthogonal to a z-axis is defined as an x-axis, and a second axis orthogonal to the x-axis and the z-axis is defined as a y-axis. An x-axis rotational direction indicated by the arrow 103p is a pitch direction, a y-axis rotational direction indicated by the arrow 103y is a yaw direction, and a z-axis rotation direction indicated by the arrow 103r is a roll direction. The camera 101 includes an angular detection unit (hereinafter referred to as an angular velocity meter) configured to detect an angular velocity of angular shake of each direction. An arrow 104x indicates a direction parallel to an x-axis direction, an arrow 104y indicates a direction parallel to a y-axis direction, and an arrow 104z indicates a direction parallel to a z-axis direction. The camera 101 includes an acceleration detection unit (hereinafter referred to as an acceleration meter) configured to detect acceleration of shake (parallel shake) of a translation direction thereof. The imaging apparatus of the present embodiment will be described with reference to FIG. 2.

Figure 2:
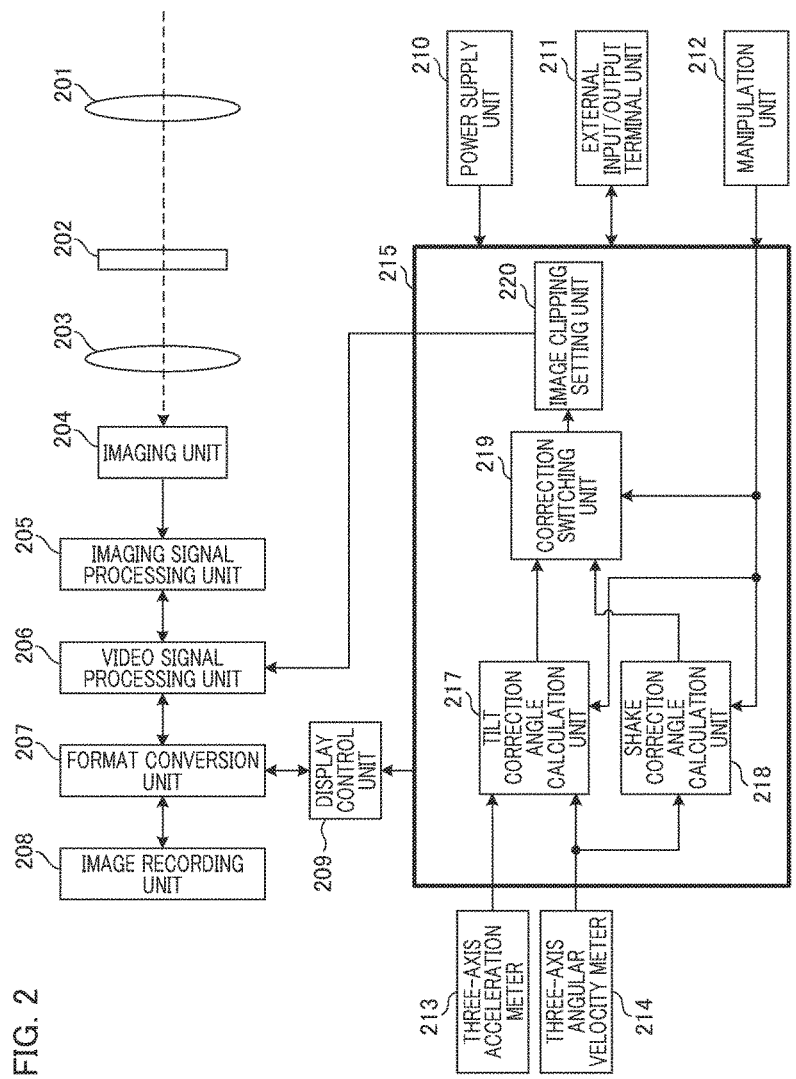
FIG. 2 is a block diagram illustrating a configuration example of an imaging apparatus of a first embodiment.

FIG. 2 is a block diagram illustrating main parts for a configuration of the imaging apparatus having a shake correction function and a tilt correction function according to the present embodiment. For an imaging optical system, the right of FIG. 2 will be described as an object side. A zoom unit 201 has a zoom lens which performs magnification and a position detection unit which detects a zoom position. A diaphragm/shutter unit 202 includes a diaphragm and a shutter. A focus unit 203 has a focus lens for performing a focus adjustment. An imaging unit 204 includes an imaging device. The imaging device receives light incident through each lens group of an imaging optical system, converts charge according to an amount of received light into an electrical signal, and outputs the electrical signal as an analog image signal to an imaging signal processing unit 205.

The imaging signal processing unit 205 converts the electrical signal output by the imaging unit 204 to a video signal. A video signal processing unit 206 processes the video signal output by the imaging signal processing unit 205 according to a purpose. For example, distortion correction, a white balance adjustment, a color interpolation process, etc. are performed on digital image data.

A format conversion unit 207 converts the digital image data output by the video signal processing unit 206 into a recording format such as a Moving Picture Experts Group (MPEG) format and outputs the converted digital image data to an image recording unit 208. The image recording unit 208 records the digital image data obtained through the conversion by the format conversion unit 207 on a recording medium such as a non-volatile memory. A display control unit 209 controls the digital image data output by the video signal processing unit 206 to be displayed on a screen such as a small liquid crystal display (LCD).

A shake detection unit includes a three-axis acceleration meter 213 and a three-axis angular velocity meter 214. The three-axis acceleration meter 213 detects accelerations in the directions indicates by the arrows 104*x*, 104*y*, and 104: of FIG. 1 and outputs detection signals. The three-axis angular velocity meter 214 detects angular velocities in the directions indicates by the arrows 103*p*, 103*y*, and 103*r* of FIG. 1 and outputs detection signals. A control unit 215 processes the detection signals obtained by the three-axis acceleration meter 213 and the three-axis angular velocity meter 214. The control unit 215 is a control center unit which controls the overall system. The power supply unit 210 supplies power to the overall system according to a purpose. An external input/output terminal unit 211 inputs/outputs a communication signal and a video signal to/from an external apparatus. A manipulation unit 212 is used by a user to manipulate the system.

The control unit 215 includes a tilt correction angle calculation unit 217 and a shake correction angle calculation unit 218. Hereinafter, the tilt correction angle calculation unit 217 is referred to as a first calculation unit and the shake correction angle calculation unit 218 is referred to as a second calculation unit. The first calculation unit 217 acquires the detection signals output by the three-axis acceleration meter 213 and the three-axis angular velocity meter 214 and calculates a tilt correction angle. The second calculation unit 218 acquires the detection signal output by the three-axis angular velocity meter 214 and calculates a shake correction angle. A correction switching unit 219 switches whether to perform the correction on the basis of the output of the first calculation unit 217 or whether to perform the correction on the basis of the output of the second calculation unit 218 according to an output of the manipulation unit 212. An image clipping setting unit 220 acquires an output of the correction switching unit 219 and performs setting for clipping a part of an image in accordance with an amount of correction for every frame. The units will be described in detail below.

Next, electronic image-blur correction control for performing the correction by clipping a part of an image in accordance with an amount of correction for every frame will be described with reference to FIGS. 3A and 3B.

Figure 3A:
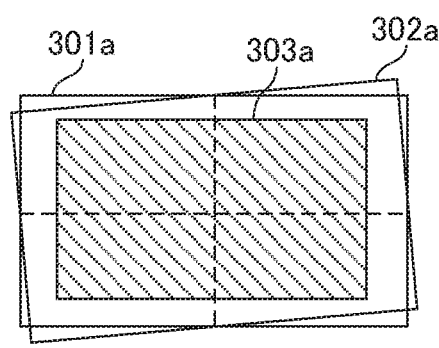
FIGS. 3A and 3B are explanatory diagrams of an image clipping process in the first embodiment.

FIG. 3A is a diagram illustrating an image corrected by the electronic image-blur correction control performed by the image clipping setting unit 220 and the video signal processing unit 206. From a result of calculating a roll correction angle, the image clipping setting unit 220 calculates a roll correction amount for performing rotation correction. An image 301*a* indicates a captured image input to the video signal processing unit 206. An image 302*a* indicates a rotated image after a rotation process is performed on the basis of the roll correction amount for the captured image 301*a*. Further, in the electronic image-blur correction, a process of clipping an inscribed portion having the same aspect ratio as that of the captured image 301*a* as an output image 303*a* from the rotated image 302*a* is performed. The electronic image-blur correction in the roll direction is implemented by performing the clipping process on each frame of a moving image.

Figure 3B:
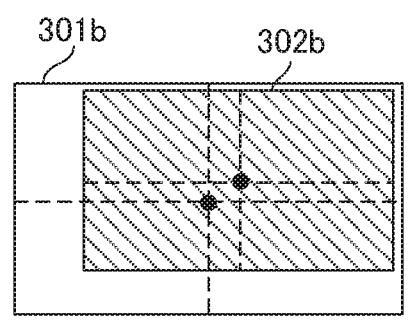

Next, FIG. 3B is a diagram illustrating image-blur correction of an image in a vertical/horizontal direction (a translation direction) to be performed by the image clipping setting unit 220 and the video signal processing unit 206. In the correction in the translation direction, an amount of image shift for correcting angular shake in a pitch/yaw direction is calculated from focal length information based on a shake angle and zoom position information and a process of clipping an image in accordance with the amount of image shift is performed. An image 301*b* indicates a captured image input to the video signal processing unit 206. An image 302*b* is an image corresponding to an angle of view clipped in accordance with an amount of horizontal/vertical image shift from the captured image 301*b*. Electronic image-blur correction in the translation direction is implemented by performing the clipping process on each frame of a moving image.

Figure 4:
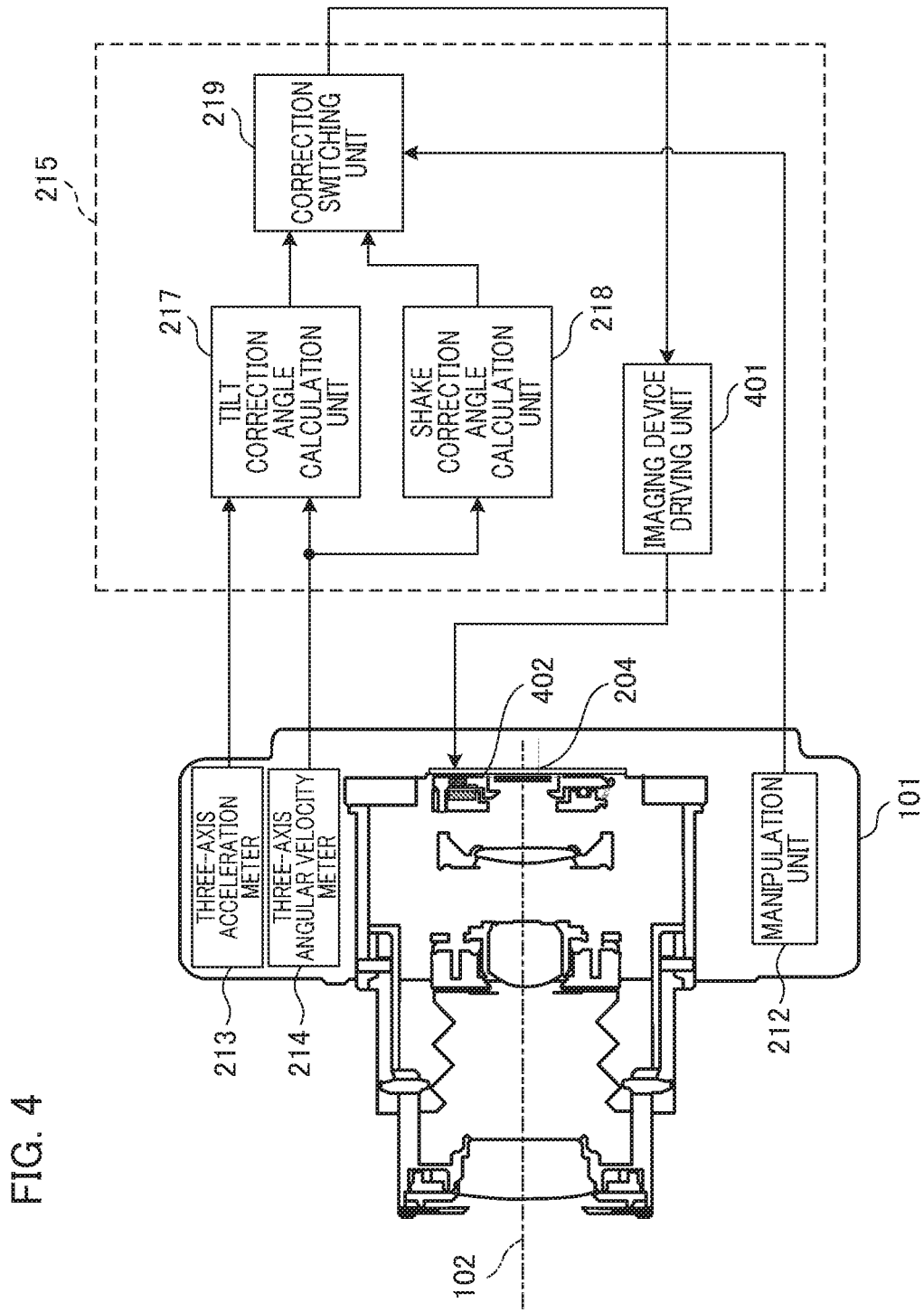
FIG. 4 is a block diagram illustrating a configuration of the imaging apparatus of the first embodiment.

It is possible to implement the electronic image-blur correction in a pitch/yaw/roll direction for every moving-image frame in the image clipping process, but it is also possible to combine optical image-blur correction. For example, there is a method of optically performing control in a mechanical driving scheme before imaging by the imaging device and performing correction in the pitch/yaw/roll direction by a shift of an optical axis and rotation around the optical axis. A specific example is illustrated in FIG. 4. FIG. 4 is a block diagram illustrating a configuration example of an imaging apparatus having a driving mechanism unit of an image device. A driving mechanism unit 402 is a mechanism unit which shifts and moves the imaging device in a direction orthogonal to an optical-axis direction and rotates the imaging device around an optical axis. Reference signs used above are used for configuration units similar to those of FIG. 2 and description thereof will be omitted.

An imaging device driving unit 401 acquires an output of the correction switching unit 219, amplifies pitch and yaw correction angles on the basis of a focal length obtained by zoom position information from the zoom unit 201, and calculates a target value of an amount of shift drive of the imaging device. Also, the imaging device driving unit 401 calculates a target value of an amount of rotation drive of the imaging device on the basis of a roll correction angle. On the basis of the target value of the calculated amount of shift drive and the target value of rotation drive, the driving mechanism unit 402 moves the imaging device, so that the shake correction and the tilt correction are performed.

A method of shifting and rotating the imaging device has been described with reference to FIG. 4, but this is one example. In addition thereto, there are the following forms.

Form in which the correction in the translation direction is performed by shifting an optical member (a shift lens) embedded in a part of the imaging optical system in a direction orthogonal to the optical axis.

Form in which corrections in the translation direction and the rotation direction are performed using the driving of both the imaging device and the shift lens.

Form in which correction is performed by rotating and driving the barrel in which the lens and the imaging device are integrated on the basis of a correction angle.

The user performs ON/OFF setting of whether to perform the shake correction (shake correction setting) and ON/OFF setting of whether to perform the tilt correction (tilt correction setting) using the manipulation unit 212. When a manipulation instruction of the user is received, the manipulation unit 212 outputs a manipulation instruction signal to the control unit 215. FIG. 14 illustrates a setting example of mode switching by a mode change manipulation in the manipulation unit 212 and corresponds to a setting screen displayed on the display unit. ON/OFF settings in the horizontal direction and the flapping direction are possible in relation to the tilt correction.

In an example of the electronic image blur correction of FIG. 2, it is possible to enlarge a correction range of translation, roll, or the like by enlarging a clipping range of an image. However, the image deterioration due to degradation of resolution according to clipping of an image or the reduction of an angle of view of photographing after the clipping may occur. Consequently, it is difficult to enlarge a correction range by changing a size of clipping and control is performed within a limited correction range. Therefore, in the present embodiment, the correction range remains fixed or is not largely changed and a maximum correction range of a tilt correction angle or a shake correction angle is changed by the shake correction setting and the tilt correction setting from the manipulation unit 212. In addition, calculation parameters within the first calculation unit 217 and within the second calculation unit 218 are also changed by the shake correction setting and the tilt correction setting from the manipulation unit 212. Thereby, it is possible to obtain a user-desired correction effect within a limited correction range. Hereinafter, calculation processes of the second calculation unit 218 and the first calculation unit 217 to be performed on the basis of the shake correction setting and the tilt correction setting will be described.

Figure 5:
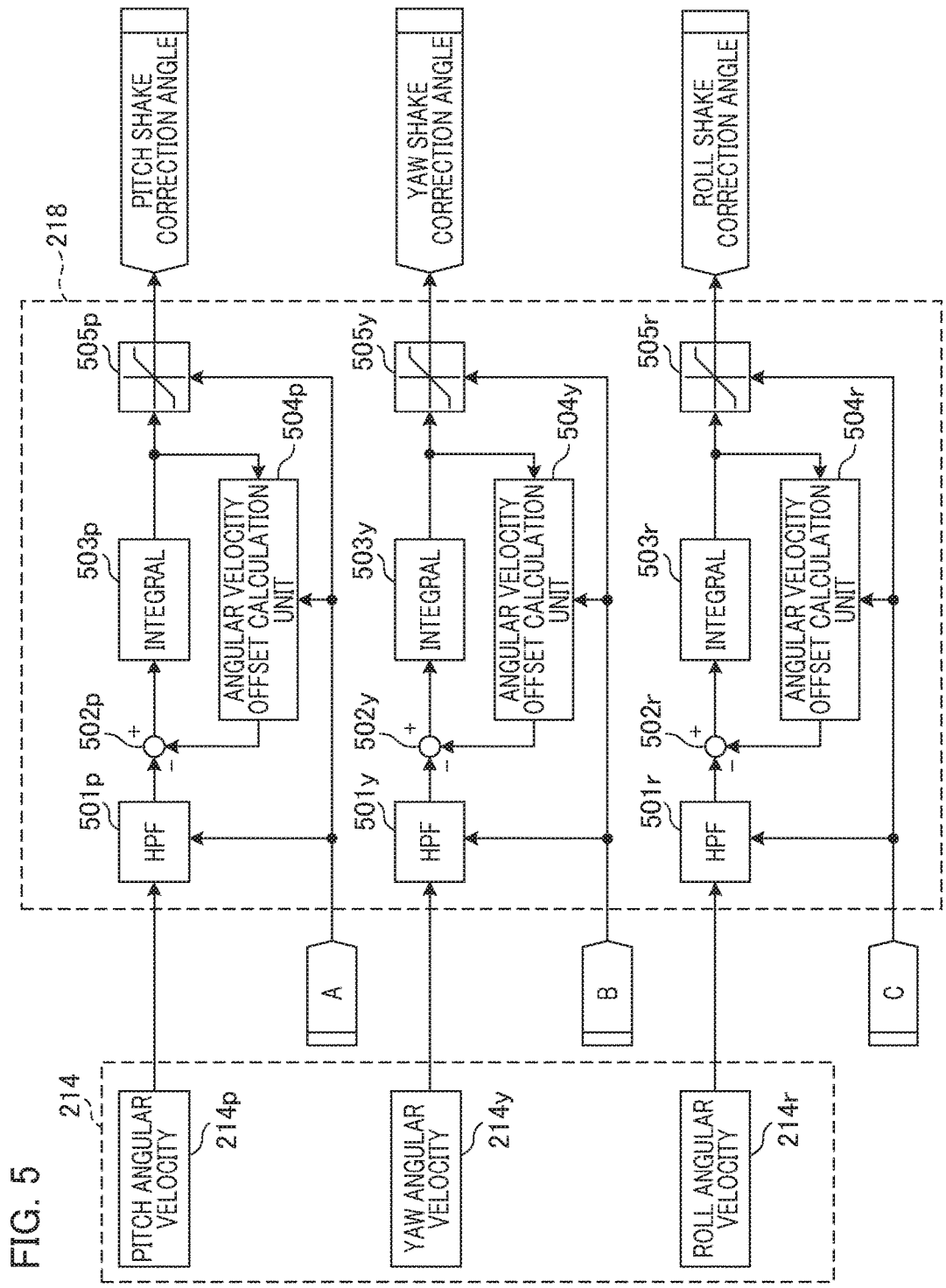
FIG. 5 is a block diagram illustrating a shake correction angle calculation unit of the first embodiment.
Figure 6:
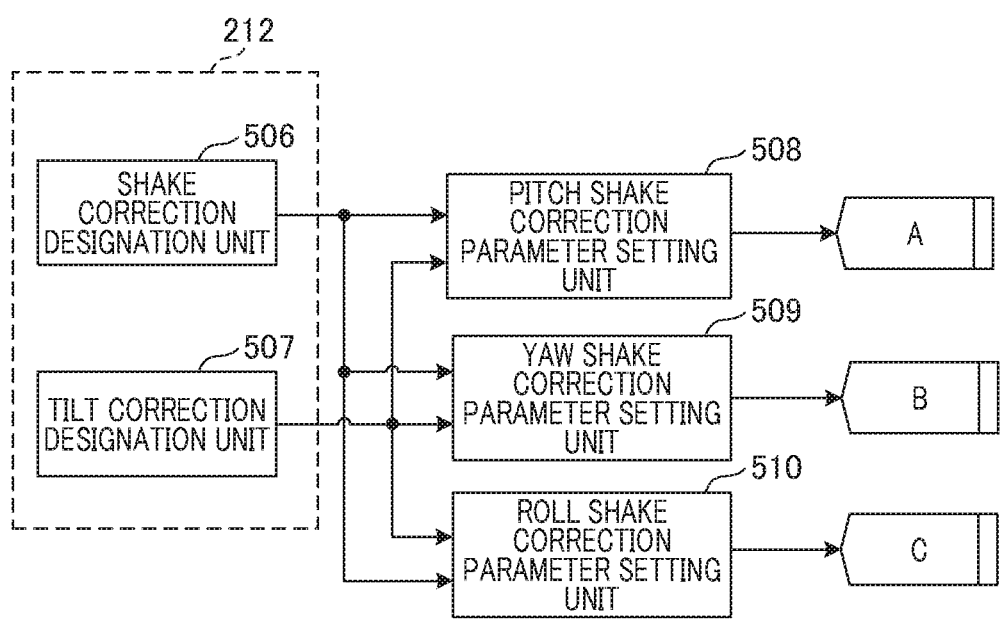
FIG. 6 is a block diagram illustrating a configuration of shake correction parameter settings in the first embodiment.

First, a shake correction angle calculation process by the second calculation unit 218 will be describe with reference to FIGS. 5 and 6. The three-axis angular velocity meter 214 outputs detection signals of a pitch angular velocity 214$p$, a yaw angular velocity 214$y$, and a roll angular velocity 214$r$. The detection signals are input to HPF units 501$p$, 501$y$, and 501$r$. p, y, and r are symbols for identifying pitch, yaw, and roll. After a direct current (DC) component is cut in a corresponding high-pass filter (HPF), the detection signals are input to subtractors 502$p$, 502$y$, and 502$r$. The subtractors subtract outputs of angular velocity offset calculation units 504$p$, 504$y$, and 504$r$ from outputs after HPF processing and outputs signals after subtractions to integrators 503$p$, 503$y$, and 503$r$. Outputs after integral processing by the integrators are sent to limit units 505$p$, 505$y$, and 505$r$ and the angular velocity offset calculation units 504$p$, 504$y$, and 504$r$. The limit units 505$p$, 505$y$, and 505$r$ limit input values to values equal to or less than a predetermined value and calculate a pitch shake correction angle, a yaw shake correction angle, and a roll shake correction angle.

The angular velocity offset calculation units 504$p$, 504$y$, and 504$r$ calculate offset amounts on the basis of magnitudes of shake correction angles in previous sampling (previous values of shake correction angles) and output the offset amounts to subtractors 502$p$, 502$y$, and 502$r$. The angular velocity offset calculation unit sets an offset to zero if the shake angle is less than or equal to a threshold value A and sets an offset amount so that the offset amount increases according to a magnitude of a previous value of the shake correction angle if the shake angle is greater than the threshold value A.

Shake correction parameter setting units 508, 509, and 510 of FIG. 6 set shake correction parameters of the axes of the pitch, the yaw, and the roll on the basis of designation information of a shake correction designation unit 506 and a tilt correction designation unit 507. The pitch shake correction parameter setting unit 508, the yaw pitch shake correction parameter setting unit 509, and the roll shake correction parameter setting unit 510 manages shake correction parameters of axes and the shake correction parameters are set according to states of the shake correction designation unit 506 and the tilt correction designation unit 507. The pitch shake correction parameter set by the shake correction parameter setting unit 508 is input to the HPF unit 501$p$, the angular velocity offset calculation unit 504$p$, and the limit unit 505$p$. The yaw shake correction parameter set by the shake correction parameter setting unit 509 is input to the HPF unit 501$y$, the angular velocity offset calculation unit 504$y$, and the limit unit 505$y$. The roll shake correction parameter set by the shake correction parameter setting unit 510 is input to the HPF unit 501$r$, the angular velocity offset calculation unit 504$r$, and the limit unit 505$r$. If the shake correction effect is decreased, cutoff frequencies of the HPF units 501$p$, 501$y$, and 501$r$ are set to be high and the parameters are set so that offset amounts of the angular velocity offset calculation units 504$p$, 504$y$, and 504$r$ increase. The parameters are set so that limit threshold values of the limit units 505$p$, 505$y$, and 505$r$ decrease. If the shake correction effect is increased, cutoff frequencies of the HPF units 501$p$, 501$y$, and 501$r$ are set to be low and the parameters are set so that offset amounts of the angular velocity offset calculation units 504$p$, 504$y$, and 504$r$ decrease. The parameters are set so that limit threshold values of the limit units 505$p$, 505$y$, and 505$r$ increase. The parameters are set according to the correction ranges in the translation direction and the roll direction.

The following Table 1 shows an example of correction ratios of corrections according to the shake correction setting and the tilt correction setting. For the tilt correction, horizontal tilt setting which is tilt correction in the horizontal direction (the roll direction) and flapping tilt setting which tilt correction in the flapping direction (the pitch direction or the yaw direction) are possible. Hereinafter, the rolling shutter distortion is also referred to as an "RS distortion" for simplification.

TABLE 1

|  | Horizontal tilt correction OFF<br>Flapping tilt correction OFF | Horizontal tilt correction ON<br>Flapping tilt correction OFF | Horizontal tilt correction OFF<br>Flapping tilt correction ON | Horizontal tilt correction ON<br>Flapping tilt correction ON |
|---|---|---|---|---|
| Shake correction ON | ■Translation priority parameter<br>Translation correction ratio 6<br>Roll correction ratio 4<br>Translation RS distortion correction ratio 2<br>Roll RS distortion correction ratio 2 | ■Roll priority parameter<br>Translation correction ratio 4<br>Roll correction ratio 6<br>Translation RS distortion correction ratio 2<br>Roll RS distortion correction ratio 2 | ■Translation priority parameter<br>Translation correction ratio 6<br>Roll correction ratio 4<br>Translation RS distortion correction ratio 2<br>Roll RS distortion correction ratio 2 | ■Average parameter<br>Translation correction ratio 5<br>Roll correction ratio 5<br>Translation RS distortion correction ratio 2<br>Roll RS distortion correction ratio 2 |

TABLE 1-continued

|  | Horizontal tilt correction OFF<br>Flapping tilt correction OFF | Horizontal tilt correction ON<br>Flapping tilt correction OFF | Horizontal tilt correction OFF<br>Flapping tilt correction ON | Horizontal tilt correction ON<br>Flapping tilt correction ON |
|---|---|---|---|---|
| Shake correction OFF | ■No correction<br>Translation correction ratio 0<br>Roll correction ratio 0<br>Translation RS distortion correction ratio 0<br>Roll RS distortion correction ratio 0 | ■Roll priority parameter<br>Translation correction ratio 0<br>Roll correction ratio 12<br>Translation RS distortion correction ratio 1<br>Roll RS distortion correction ratio 1 | ■Translation priority parameter<br>Translation correction ratio 12<br>Roll correction ratio 0<br>Translation RS distortion correction ratio 1<br>Roll RS distortion correction ratio 1 | ■Average parameter<br>Translation correction ratio 6<br>Roll correction ratio 6<br>Translation RS distortion correction ratio 1<br>Roll RS distortion correction ratio 1 |

A first row-first column of Table 1 indicates the case in which the setting by the shake correction designation unit 506 is ON and the setting by the tilt correction designation unit 507 is horizontal tilt correction OFF and flapping tilt correction OFF. In this case, the parameter setting for prioritizing the shake correction effect in the translation direction is given. Correction ranges of the pitch shake correction angle and the yaw shake correction angle are set to be large. The horizontal tilt correction is not performed in relation to the roll shake correction angle and therefore the correction range of the roll shake correction angle is set to be not as large as those of the pitch and yaw shake correction angles. Consequently, a limit threshold value of a correction limit is set to be large in the limit unit 505p and the limit unit 505y and a limit threshold value in the limit unit 505r is set to be less than limit threshold values in the pitch direction and the yaw direction. Cutoff frequencies are set to be low in the HPF unit 501p and the HPF unit 501y and a cutoff frequency of the HPF unit 501r is set to be higher than the cutoff frequencies of the HPF unit 501p and the HPF unit 501y. When the shake is large, parameters are set so that offset amounts of the angular velocity offset calculation units 504p and 504y are less than that of the angular velocity offset calculation unit 504r. Thereby, the image-blur correction effects in the pitch direction and the yaw direction are relatively high and the image-blur correction effect in the roll direction is relatively low. Thus, parameters are set so that necessary effects are obtained within shake correction ranges of the pitch, the yaw, and the roll based on the shake correction setting and the tilt correction setting.

A first row-fourth column of Table 1 indicates the case in which the setting by the shake correction designation unit 506 is ON and the setting by the tilt correction designation unit 507 is horizontal tilt correction ON and flapping tilt correction ON. In this case, correction ratios are set to be distributed so that equivalent effects are provided in directions of the pitch, the yaw, and the roll. In the case of this setting, a calculation result of the second calculation unit 218 is not used because the corrections are performed at pitch, yaw, and roll angles calculated by the first calculation unit 217 to be described below. A first row-second column of Table 1 indicates the case in which the setting by the shake correction designation unit 506 is ON and the setting by the tilt correction designation unit 507 is horizontal tilt correction ON and flapping tilt correction OFF. In this case, the correction effect in the roll direction is set to be high and the correction effects in the pitch direction and the yaw direction are set to be relatively lower than that in the roll direction. In the case of this setting, a result of calculating the roll angle by the second calculation unit 218 is not used because the correction is performed at the roll angle calculated by the first calculation unit 217 in the roll direction.

A first row-third column of Table 1 indicates the case in which the setting by the shake correction designation unit 506 is ON and the setting by the tilt correction designation unit 507 is horizontal tilt correction OFF and flapping tilt correction ON. In this case, the correction effects in the pitch direction and the yaw direction are set to be high and the correction effect in the roll direction is set to be relatively lower than the correction effects in the pitch direction and the yaw direction. In the case of this setting, results of calculating the pitch angle and the yaw angle by the second calculation unit 218 are not used because the correction is performed at the pitch angle and the yaw angle calculated by the first calculation unit 217 in the pitch direction and the yaw direction.

If the setting by the shake correction designation unit 506 indicated by a second row of Table 1 is OFF, each of the limit threshold values of the limit units 505p, 505y, and 505r is set to zero. A second row-first column of Table 1 indicates the case in which the setting by the shake correction designation unit 506 is OFF and the setting by the tilt correction designation unit 507 is horizontal tilt correction OFF and flapping tilt correction OFF. In this case, the correction angles of the pitch, the yaw, and the roll are set to be zero and neither the shake correction nor the tilt correction is performed.

A second row-second column of Table 1 indicates the case in which the setting by the shake correction designation unit 506 is OFF and the setting by the tilt correction designation unit 507 is horizontal tilt correction ON and flapping tilt correction OFF. In this case, the correction ratio in the translation direction is zero and the parameter setting of the roll priority is given. A second row-third column of Table 1 indicates the case in which the setting by the shake correction designation unit 506 is OFF and the setting by the tilt correction designation unit 507 is horizontal tilt correction OFF and flapping tilt correction ON. In this case, the correction ratio in the roll direction is zero and the parameter setting of the translation priority is given. A second row-fourth column of Table 1 indicates the case in which the setting by the shake correction designation unit 506 is OFF and the setting by the tilt correction designation unit 507 is horizontal tilt correction ON and flapping tilt correction ON. In this case, correction ratios are set to be distributed so that equivalent effects are provided in directions of the pitch, the yaw, and the roll, and the correction is performed on the basis of the calculation result of the first calculation unit 217.

Next, a tilt correction angle calculation process of the first calculation unit 217 will be described with reference to FIG. 7. First, a method of calculating a horizontal tilt correction angle will be described. A three-axis acceleration meter 213 outputs acceleration detection signals in directions of three axes orthogonal to one another. Also, the three-axis angular velocity meter 214 outputs detection signals of roll angular velocity 214r, pitch angular velocity 214p, and yaw angular velocity 214y.

The horizontal angle calculation unit 601 acquires the output of the acceleration meter 213 and the roll angular velocity 214r and calculates a horizontal angle (an absolute roll angle). The horizontal angle calculation unit 601 performs signal synthesis on an absolute roll angle of a camera calculated from the output of the acceleration meter 213 and the roll angular velocity 214r in a process based on a Kalman filter or the like and calculates the absolute roll angle as the horizontal angle. It is possible to calculate a high-precision horizontal angle (an absolute roll angle) in a wide frequency band using the acceleration meter and the angular velocity meter.

An image-blur correction angle calculation unit 602 acquires the roll angular velocity 214r and calculates a roll shake correction angle in a method similar to the roll shake correction angle calculation method of FIG. 5. Thereby, a roll angle at which a low-frequency component is cut is calculated. However, in the image-blur correction angle calculation units 602, 606, and 609 of FIG. 7, a process of changing an HPF parameter according to the setting by the manipulation unit 212, the parameter of the angular velocity offset calculation unit, and the limit threshold value of the limit unit as described with reference to FIG. 5 is not performed.

Figure 8:
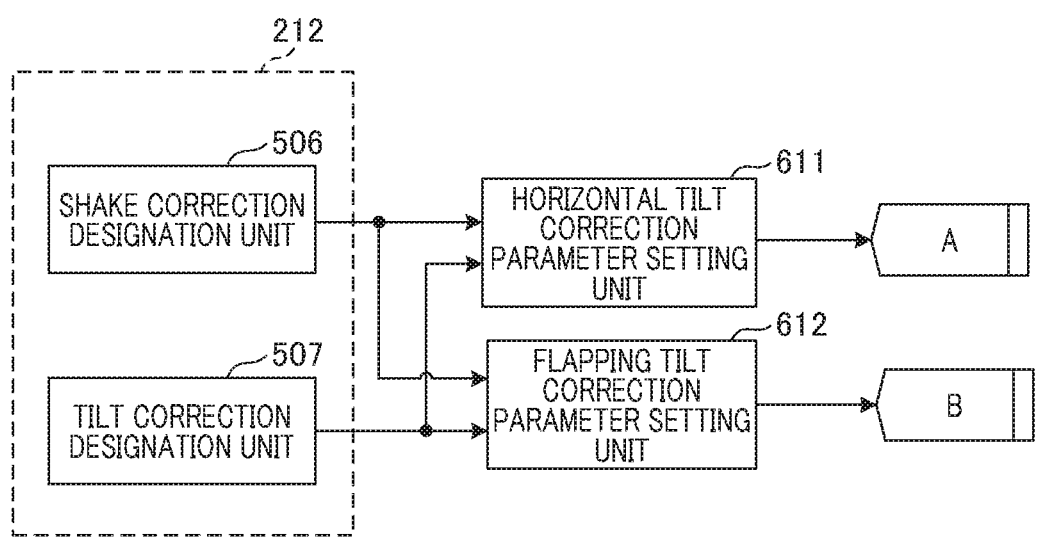
FIG. 8 is a block diagram illustrating a configuration of tilt correction parameter settings in the first embodiment.

A horizontal correction angle calculation unit 603 acquires the absolute roll angle which is the output of the horizontal angle calculation unit 601, the roll shake correction angle which is the output of the image-blur correction angle calculation unit 602, and the horizontal tilt correction parameter and calculates a roll tilt correction angle. The horizontal tilt correction parameter setting unit 611 of FIG. 8 sets the horizontal tilt correction parameter according to states of the shake correction designation unit 506 and the tilt correction designation unit 507. The internal calculation of the horizontal correction angle calculation unit 603 will be described below.

Next, a method of calculating the flapping correction angle will be described.

A flapping angle selection unit 604 acquires an absolute roll angle which is the output of the horizontal angle calculation unit 601 and selects whether to set a flapping angle at a pitch axis or whether to set a flapping angle at a yaw axis according to a magnitude of the absolute roll angle. The flapping angle selection unit 604 outputs selection results to flapping correction angle calculation units 607 and 610. The flapping angle selection unit 604 sets the flapping angle at the pitch axis as long as the absolute roll angle is within the predetermined angle range and sets the flapping angle at the yaw axis as long as the absolute roll angle is out of the predetermined angle range. The predetermined angle range is, for example, a range within ±45 degrees, a range of 135 degrees to 180 degrees, or a range of −135 degrees to −180 degrees using 0 degrees as a reference at a normal position of the camera.

A pitch flapping angle calculation unit 605 acquires the output of the three-axis acceleration meter 213 and the pitch angular velocity 214p and calculates a pitch flapping angle (an absolute pitch angle). The pitch flapping angle calculation unit 605 performs signal synthesis on an absolute pitch angle of a camera calculated from the output of the three-axis acceleration meter 213 and the pitch angular velocity 214p in a process based on a Kalman filter or the like and calculates the absolute pitch angle.

An image-blur correction angle calculation unit 606 acquires the pitch angular velocity 214p and calculates a pitch shake correction angle in a method similar to the pitch shake correction angle calculation method of FIG. 5. A pitch angle at which a low-frequency component is cut is calculated. A flapping correction angle calculation unit 607 acquires the output of the flapping angle selection unit 604, the output of the pitch flapping angle calculation unit 605, the output of the image-blur correction angle calculation unit 606, and the flapping tilt correction parameter and calculates a pitch tilt correction angle. Here, if the flapping angle selection unit 604 sets the flapping angle at the yaw axis, the output of the image-blur correction angle calculation unit 606 is calculated to be set as the pitch tilt correction angle because the calculation of the absolute pitch angle is not correctly performed. The flapping tilt correction parameter setting unit 612 of FIG. 8 sets the flapping tilt correction parameter according to states of the shake correction designation unit 506 and the tilt correction designation unit 507.

A yaw flapping angle calculation unit 608 acquires the output of the three-axis acceleration meter 213 and the yaw angular velocity 214y and calculates a flapping yaw angle (an absolute yaw angle). The yaw flapping angle calculation unit 608 performs signal synthesis on an absolute yaw angle of a camera calculated from the output of the three-axis acceleration meter 213 and the yaw angular velocity 214y in a process based on a Kalman filter or the like and calculates the absolute yaw angle. An image-blur correction angle calculation unit 609 acquires the yaw angular velocity 214y and calculates a yaw shake correction angle in a method similar to the yaw shake correction angle calculation method of FIG. 5. A yaw angle at which a low-frequency component is cut is calculated. A flapping correction angle calculation unit 610 acquires the output of the flapping angle selection unit 604, the output of the yaw flapping angle calculation unit 608, the output of the image-blur correction angle calculation unit 609, and the flapping tilt correction parameter and calculates a yaw tilt correction angle. Here, if the flapping angle selection unit 604 sets the flapping angle at the pitch axis, the output of the image-blur correction angle calculation unit 609 is calculated to be set as the yaw tilt correction angle because the calculation of the absolute yaw angle is not correctly performed.

Figure 9:
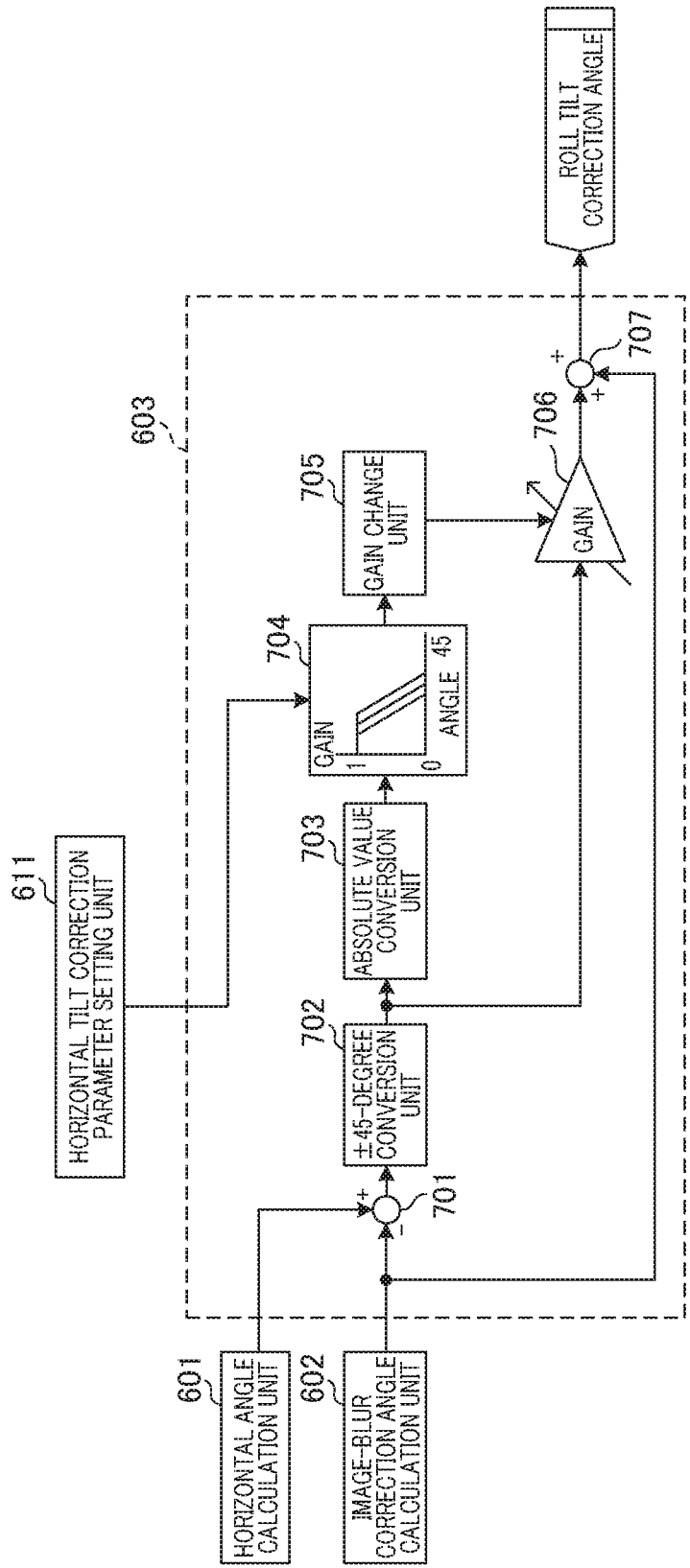
FIG. 9 is a block diagram illustrating a horizontal correction angle calculation unit of the first embodiment.
Figure 10A:
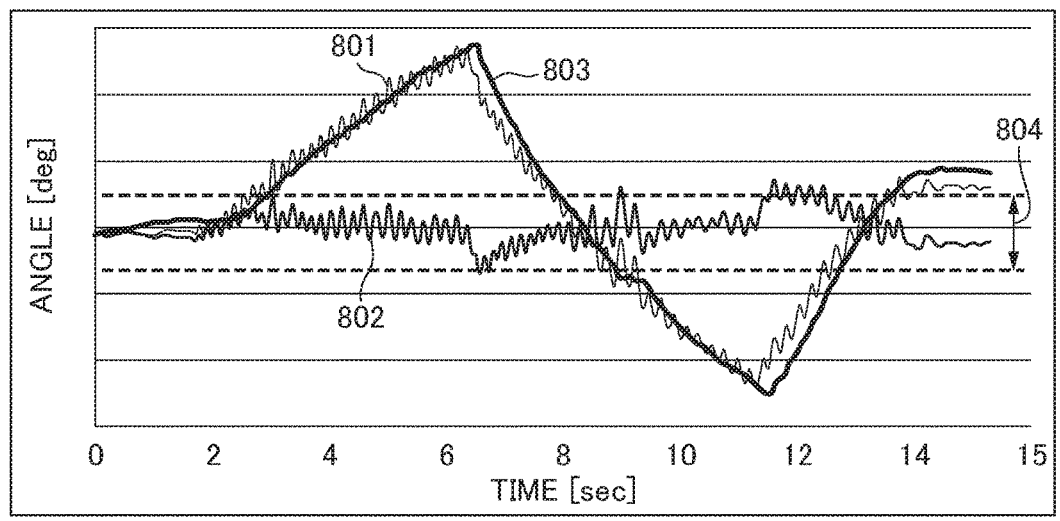
FIGS. 10A and 10B are explanatory diagrams of angle waveforms of the imaging apparatus in the first embodiment.

FIG. 9 is a block diagram illustrating an internal configuration of the horizontal correction angle calculation unit 603. The absolute roll angle from the horizontal angle calculation unit 601 and a roll angle at which a low frequency is removed from the image-blur correction angle calculation unit 602 are input to a subtractor 701. A waveform example is illustrated in FIG. 10A. The horizontal axis represents a time axis and the vertical axis represents an angle axis. A waveform 801 indicates an absolute roll angle and a waveform 802 indicates a roll correction angle at which a low frequency is removed. A waveform 803 indicates the output of the subtractor 701, that is, a result of subtracting the roll correction angle at which the low frequency is removed from the absolute roll angle.

A ±45-degree conversion unit 702 converts the output of the subtractor 701 from an angle value of ±180 degrees to an angle value of ±45-degrees. Here, the tilt of the camera is assumed to be 0 degrees (a normal position) when the imaging device is positioned in a direction perpendicular to a gravity direction. The ±45-degree conversion unit 702 subtracts 90 degrees if the angle after the subtraction is greater than +45 degrees and less than or equal to +135 degrees. Also, the ±45-degree conversion unit 702 subtracts 180 degrees if the angle after the subtraction is greater than ±135 degrees and less than or equal to +180 degrees. Also, the ±45-degree conversion unit 702 adds 90 degrees if the angle after the subtraction is less than or equal to −45 degrees and greater than −135 degrees and adds 180 degrees if the angle after the subtraction is less than or equal to −135 degrees and greater than −180 degrees. Through this process, the angle of the camera is converted into an angle of a ±45-degree range around 0 degrees, 90 degrees, −90 degrees, and 180 degrees. This is a process for determining a reference orientation in which tilt correction is performed. The reference orientation differs according to whether the camera is posed at a horizontal position (a normal position) or a vertical position. If the user holds the camera at the horizontal position, an orientation in which a left/right direction axis of the imaging device is perpendicular to the gravity direction is set as the reference orientation and an angle at that time is set as a reference angle (0 degrees). The tilt correction is performed so that a horizontal state is maintained at the reference angle. On the other hand, if the user holds the camera at a vertical position, an orientation in which an upward/downward direction of the imaging device is perpendicular to the gravity direction is set as the reference orientation. The tilt correction is performed using a position after a rotation of ±90 degrees from the normal position of the camera as the reference angle (0 degrees).

A variable gain unit 706 acquires the output of the ±45-degree conversion unit 702 and multiplies the output by a gain. The gain value is set between 0 and 1. An adder 707 acquires an output of the variable gain unit 706 and an output of the image-blur correction angle calculation unit 602 and adds a signal after the multiplication of the gain to an angle signal after low-frequency removal shake correction. For example, if the gain value is 1, an output value of the adder 707 has the same value as a value obtained by converting an absolute angle into an angle of ±45 degrees, wherein the value is an output of the horizontal angle calculation unit 601. Also, if the gain of the variable gain unit 706 is 0, the output value of the adder 707 has the same value as an angle signal after the low-frequency removal shake correction which is the output of the image-blur correction angle calculation unit 602. If the gain value is between 0 and 1, a synthetic ratio between the absolute angle and the angle after the low-frequency removal shake correction changes according to the gain value. The adder 707 outputs a roll tilt correction angle.

Next, a method of setting a gain of the variable gain unit 706 will be described.

An absolute value conversion unit 703 acquires an output of the ±45-degree conversion unit 702 and converts the output of the ±45-degree conversion unit 702 into an absolute value. An output of the absolute value conversion unit 703 is input to a gain table 704. The gain table 704 has data for determining a gain corresponding to an angle after absolute value conversion. For example, when the angle after the absolute value conversion is denoted by θ and the gain is denoted by G, the data is set as follows.

If θ is within an angle threshold value 1, G=1.
If θ is greater than or equal to an angle threshold value 2, G=0.
If θ is between the angle threshold value 1 and the angle threshold value 2, 0<G<1.

"Angle threshold value 1<Angle threshold value 2" and "Angle threshold value 2<45 degrees." If "0<G<1," table data having characteristics obtained by performing a linear interpolation between gain values 1 and 0 is given. Although table data is created at two points in this example and a straight line based on a linear interpolation is connected between the two points in this example, it is possible to create table data at three or more points.

A range 804 illustrated in FIG. 10A indicates an example of a range set in angle threshold value 1 and the gain value is set to 1 if a part of a waveform 803 is positioned within the range 804. Also, if the part of the waveform 803 is positioned out of the range 804, the gain value is less than 1 and is set to zero when it is greater than or equal to angle threshold value 2.

Also, the gain table 704 changes according to whether the correction range (the roll correction range) of the horizontal tilt correction is large in accordance with the output of the horizontal tilt correction parameter setting unit 611. For example, the correction range of the horizontal tilt correction is assumed to be set in three steps of "largeness," "medium," and "smallness." In this case, magnitudes of angle threshold value 1 and angle threshold value 2 of the gain table 704 change in the relationship of the time of "largeness"> the time of "medium"> the time of "smallness." In FIG. 9, a change of stepwise characteristics in three types of straight lines based on a linear interpolation is illustrated. Thereby, if the correction effect is desired to increase, the correction effect of the tilt correction is prioritized by increasing a movable range of the tilt correction. If the correction effect decreases, the tilt correction is limited, but the effect of the shake correction is obtained.

A gain change unit 705 changes the gain of the variable gain unit 706 in accordance with the output of the gain table 704. Flapping angles output from the flapping angle calculation units 605 and 608 are also simultaneously input to the gain change unit 705. For the flapping angle, an angle of a pitch axis or a yaw axis selected by the flapping angle selection unit 604 is set. When the flapping angle is within a predetermined range (for example, −30 degrees to +30 degrees), the horizontal angle calculated by the horizontal angle calculation unit 601 is determined to be a highly reliable signal and the output of the gain table 704 is output to the variable gain unit 706 as it is. On the other hand, when the flapping angle is out of the predetermined range, the horizontal angle calculated by the horizontal angle calculation unit 601 is determined to be a signal with low reliability. In this case, the gain change unit 705 gradually sets the output of the gain table 704 to zero for a predetermined time. Also, when the flapping angle transitions within the predetermined range, the gain change unit 705 is reset to the output of the gain table 704 gradually for the predetermined time.

To prevent the degradation of the tilt correction effect due to an erroneous calculation of the horizontal angle when the flapping angle is out of the predetermined range, the angle correction is performed by a shake correction angle signal after the low-frequency removal which is the output of the image-blur correction angle calculation unit 602. Consequently, it is possible to perform the shake correction while suppressing an influence on control due to the erroneous operation of the tilt correction.

Figure 7:
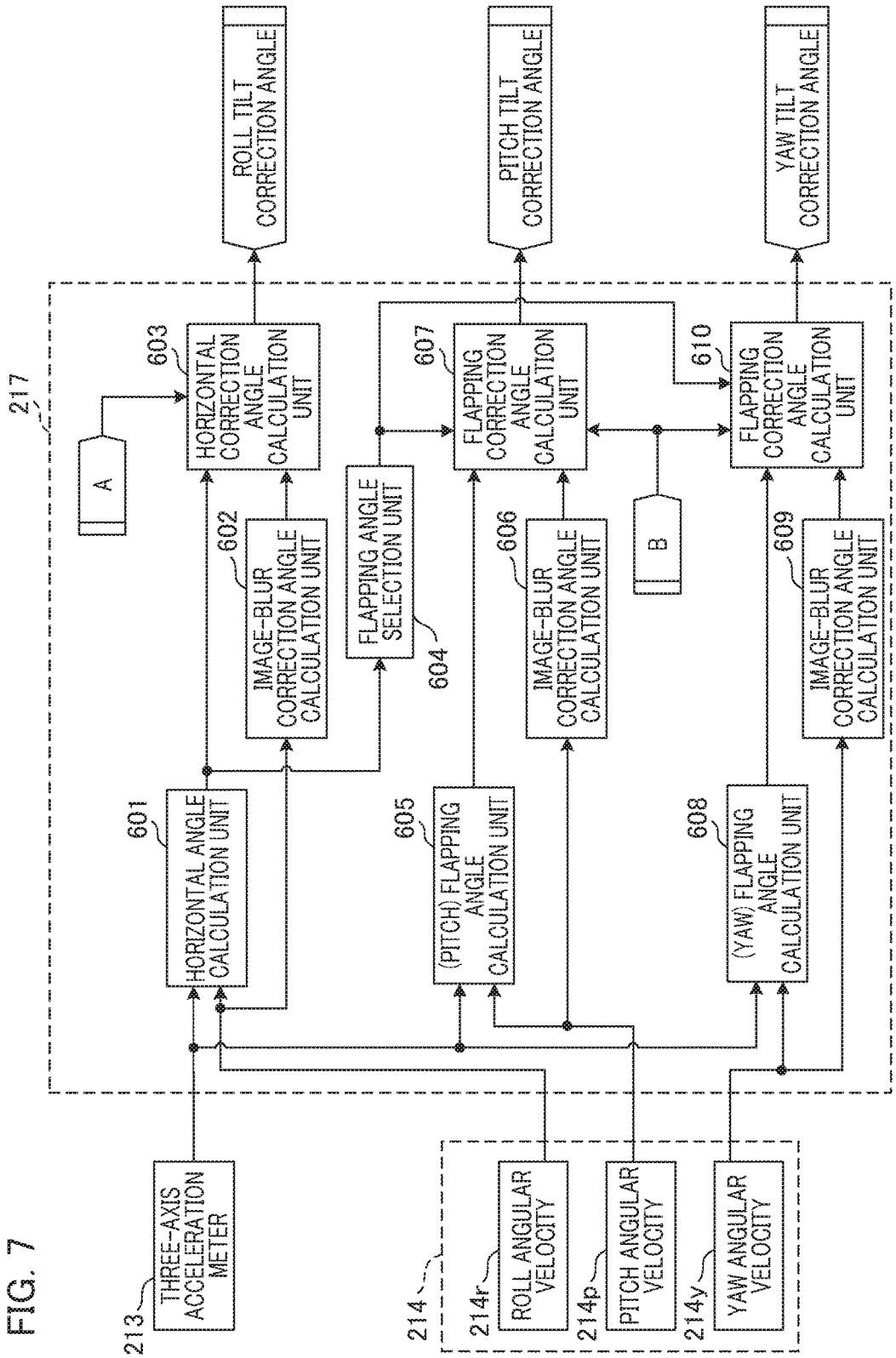
FIG. 7 is a block diagram illustrating a tilt correction angle calculation unit of the first embodiment.

The flapping correction angle calculation units 607 and 610 of FIG. 7 basically have configurations similar to that of FIG. 9. The calculation is executed on the basis of the output of the flapping angle selection unit 604 and the flapping tilt correction parameter for outputs of the flapping angle calculation units 605 and 608 and the outputs of the image-blur correction angle calculation units 606 and 609 and tilt correction angles in the pitch direction and the yaw direction are calculated.

Figure 10B:
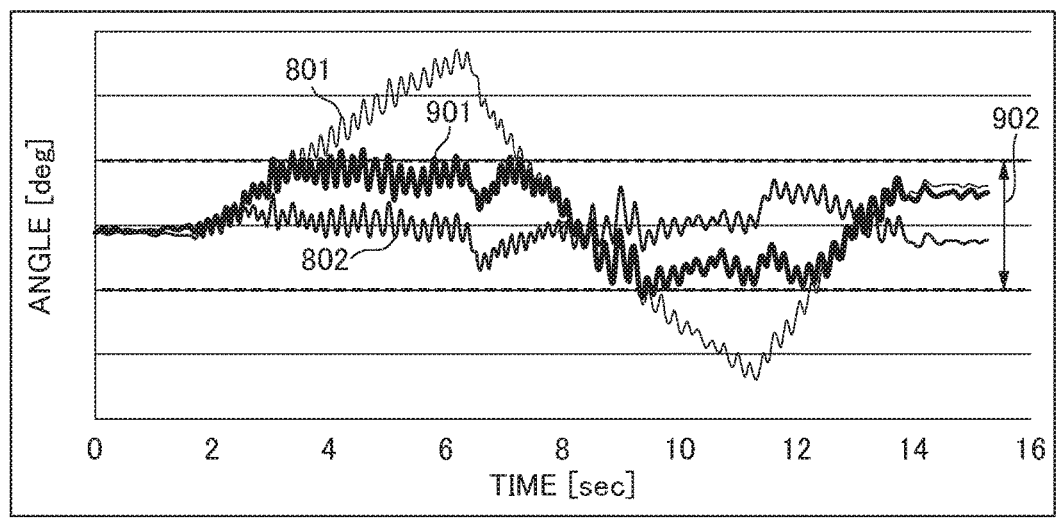

FIG. 10B illustrates a waveform example of a correction angle which is the output of the adder 707. The horizontal axis represents a time axis and the vertical axis represents an angle axis. The waveform 801 indicates an absolute roll angle and the waveform 802 indicates a low-frequency removal roll correction angle. A waveform 901 indicates an output of the adder 707 and a range 902 is a movable range of the tilt correction. The output of the adder 707 is calculated to be positioned within the range 902 as much as possible. Because the gain value of the variable gain unit 706 is set to 1 within the range 804 of FIG. 10A, the output waveform 901 of the adder 707 matches the waveform 801 of the absolute roll angle. Because the gain value of the variable gain unit 706 is set to a value less than 1 outside the range 804 of FIG. 10A, a synthetic ratio of the waveform 801 and the waveform 802 of FIGS. 10A and 10B changes according to a magnitude of a gain. It is possible to obtain a waveform 901 of a calculated correction angle so that it is finally included within the movable range 902. Also, for the range 804 and the movable range 902, a magnitude is changed by a horizontal tilt correction parameter. Because it is possible to change the movable range 902 if the correction effect of the horizontal tilt correction is intended, or not intended, to be increased, it is possible to calculate a correction angle of tilt correction in the determined movable range 902.

As described above, the internal calculations of the second calculation unit 218 and the first calculation unit 217 according to designations of the shake correction designation unit 506 and the tilt correction designation unit 507 of the manipulation unit 212 as described above have been described. A method of selecting whether to perform a tilt correction or whether to perform shake correction according to setting by the manipulation unit 212 will be described. The correction switching unit 219 of FIGS. 2 and 4 switches whether to perform control using a correction angle of either the output of the second calculation unit 218 or the output of the first calculation unit 217. This switching process is performed in directions of the pitch/yaw/roll according to settings by the shake correction designation unit 506 and the tilt correction designation unit 507 of the manipulation unit 212. A shake correction is executed in the case of ON setting by the shake correction designation unit 506 and a tilt correction is executed in the case of ON setting by the tilt correction designation unit 507. If both the shake correction designation unit 506 and the tilt correction designation unit 507 are designated to be turned OFF, no control is performed.

Next, a rolling shutter (RS) distortion correction process will be described.

In the case of the imaging apparatus having an optical image-blur correction mechanism unit as in FIG. 4, the imaging device driving unit 401 moves the imaging device for amounts of camera shake detected by the three-axis angular velocity meter 214 and the three-axis acceleration meter 213 after image-blur correction. If there is an amount of shake remaining after the image-blur correction (a remaining amount of shake), the remaining amount of shake obtained by subtracting an amount of image-blur correction from the amount of camera shake affects an RS distortion. Therefore, in the present embodiment, the RS distortion calculation unit calculates an amount of movement of an image formation position based on an RS distortion and reference range information from the remaining amount of shake. Specifically, a process of calculating a pixel position of a memory at which an image of each pixel position corrected for an RS distortion by the remaining amount of shake is formed and calculating a difference between coordinate positions thereof as an amount of movement is performed. Also, the reference range information is information for correcting the RS distortion. Thus, the RS distortion amount calculation unit calculates range information indicating a range in the memory and an amount of movement to be used to correct the RS distortion occurring in imaging based on a rolling shutter scheme, and an RS distortion correction process is performed. Also, in the case of the imaging apparatus having only the electronic correction function as in FIG. 2, the RS distortion correction process is performed on the basis of amounts of camera shake detected by the three-axis angular velocity meter 214 and the three-axis acceleration meter 213.

Figure 11:
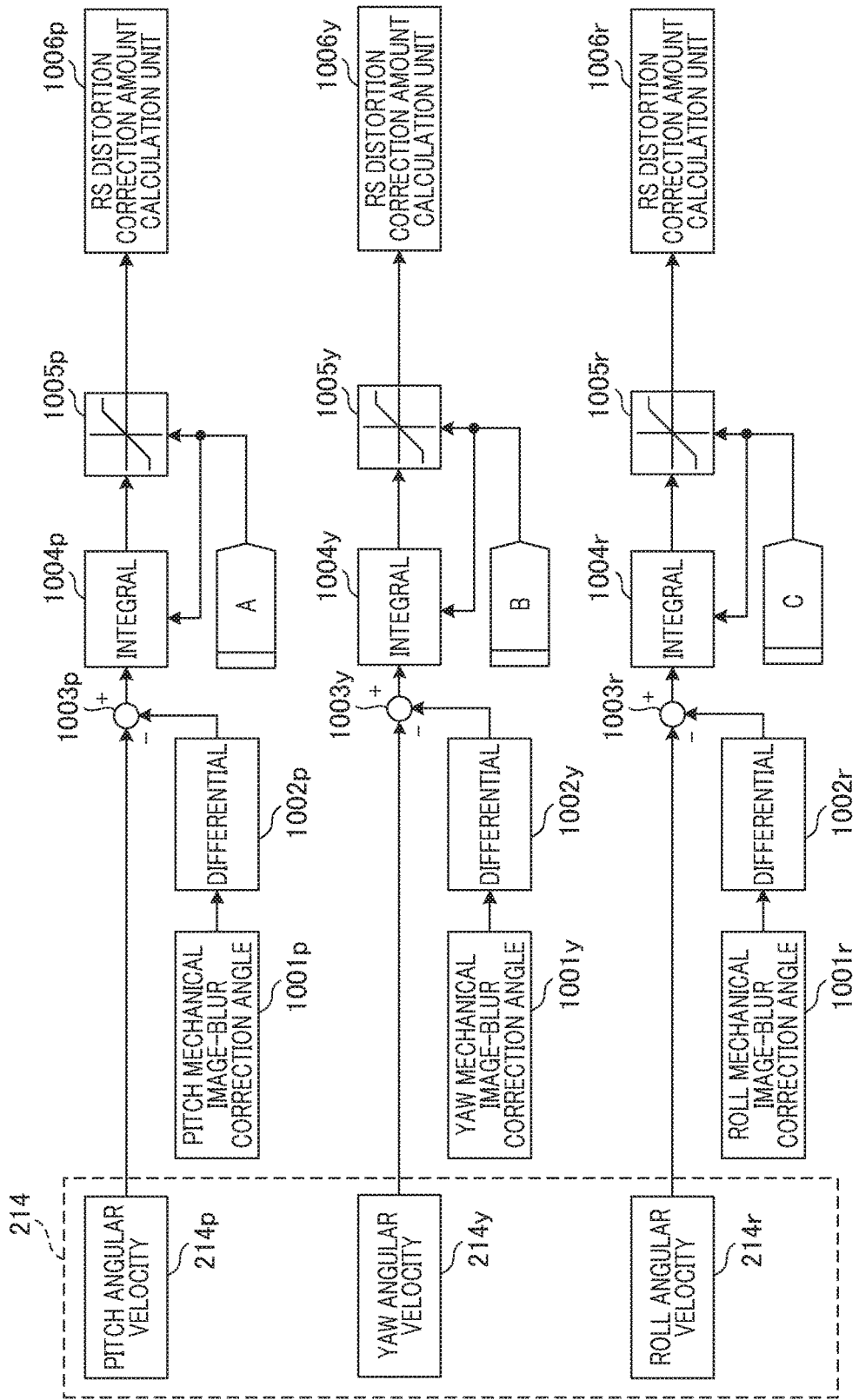
FIG. 11 is a block diagram illustrating a rolling shutter distortion correction calculation unit of the first embodiment.

A correction amount calculation process for the RS distortion correction will be described with reference to FIG. 11.

Angular velocities 214$p$, 214$y$, and 214$r$ output from the three-axis angular velocity meter 214 are input to subtractors 1003$p$, 1003$y$, and 1003$r$, respectively. In the case of an imaging apparatus which performs optical image-blur correction control, a correction angle from an image-blur correction mechanism unit is indicated by a pitch mechanism image-blur correction angle 1001$p$, a yaw mechanism image-blur correction angle 1001$y$, and a roll mechanism image-blur correction angle 1001$r$. Differentiators 1002$p$, 1002$y$, and 1002$r$ perform differential processes on correction angles and input results of the differential processes to the subtractors 1003$p$, 1003$y$, and 1003$r$.

The subtractors 1003$p$, 1003$y$, and 1003$r$ subtract correction angular velocities for an amount of mechanism image-blur correction from angular velocity outputs. The remaining angular velocity of shake to be input to an imaging plane is calculated. Outputs of the subtractors 1003$p$, 1003$y$, and 1003$r$ are input to integrators 1004$p$, 1004$y$ and 1004$r$, respectively. The integrators 1004$p$, 1004$y$, and 1004$r$ are initialized to zero at the initiation of exposure of the imaging device and an angle for an exposure period is calculated. Outputs of the integrators 1004$p$, 1004$y$, and 1004$r$ are input to limit units 1005$p$, 1005$y$, and 1005$r$, respectively, and a value greater than or equal to a predetermined value is limited. Thereby, a pitch RS distortion correction angle, a yaw RS distortion correction angle, and a roll RS distortion correction angle are calculated. Each of RS distortion correction amount calculation units 1006$p$, 1006$y$, and 1006$r$ converts an RS distortion correction angle into an amount of a unit corresponding to an amount of imaging-plane shake and determines an amount of correction in accordance with each read timing.

Figure 12:
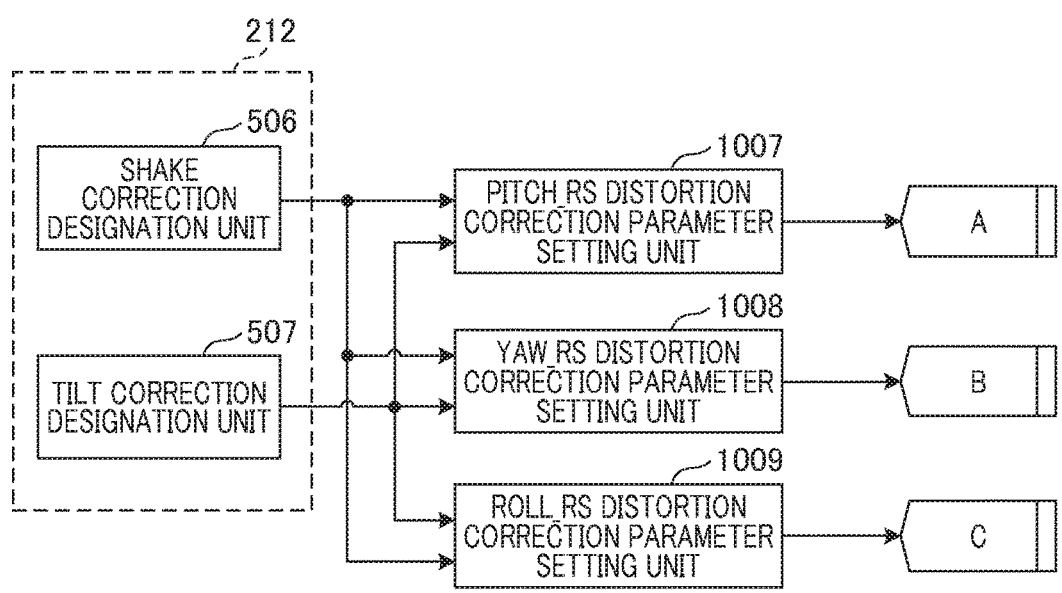
FIG. 12 is a block diagram illustrating a configuration of rolling shutter distortion correction parameter settings in the first embodiment.

RS distortion correction parameters are input to the limit units and the integrators. RS distortion correction parameter setting units 1007, 1008, and 1009 of FIG. 12 set RS distortion correction parameters of axes of pitch, yaw, and roll according to states of the shake correction designation unit 506 and the tilt correction designation unit 507. If the RS distortion correction effect is increased, the RS distortion correction parameters are set so that limit threshold values of the limit units 1005$p$, 1005$y$, and 1005$r$ increase. If the RS distortion correction effect is decreased, the RS distortion correction parameters are set so that limit threshold values decrease. Also, a filter of a configuration shown in the right side of the following Formula (1) in which the integral and the HPF are combined is used in the integrators 1004$p$, 1004$y$, and 1004$r$. This becomes the same formula as a formula for multiplying a time constant T by a transfer function of a low-pass filter (LPF) of the time constant T. s is a Laplace variable.

$$\frac{1}{s} \times \frac{Ts}{Ts+1} = \frac{T}{Ts+1} \quad (1)$$

When offset frequencies of the integrators 1004p, 1004y, and 1004y are set to be low (the time constant increases), a control band of the RS distortion correction is widened. In contrast, when the offset frequency is high (the time constant is small), the control band of the RS distortion correction is narrowed and control at a frequency is weakened. If the correction range of the RS distortion correction is narrow, but the shake increases and a large RS distortion occurs, an integral signal is immediately limited to a limit threshold value by the limit unit 1005. In this case, there is a possibility that an RS distortion correction is effectuated in only a line portion of the first half of exposure and no RS distortion correction is effectuated in a line portion of the second half of exposure. Therefore, on condition that the movable range is narrow and the limit value is small, the cutoff frequency of the integrator is set to be high. A correction effect for every correction line is weak, but it can be calculated as a signal for which a correctable angle can be secured to some extent as the overall correction effect. Also, on condition that the correction range is large and the limit value is large, the cutoff frequency of the integrator is set to be low and the correction effect of the RS distortion correction is strong.

Processes of shake correction and tilt correction of a camera in the present embodiment will be described with reference to FIG. 13. The process illustrated in the flowchart of FIG. 13 starts when the camera is powered on and is iteratively executed in a predetermined sampling period.

The control unit 215 acquires an output of the three-axis angular velocity meter 214 in S1101 and acquires an output of the three-axis acceleration meter 213 in the next S1102, and the process proceeds to S1103. In S1103, parameters of shake correction and tilt correction are set according to designations of the shake correction designation unit 506 and the tilt correction designation unit 507 by the manipulation unit 212. The parameters of the shake correction are the cutoff frequencies of the HPF units 501p, 501y, and 501r, the parameters of the angular velocity offset calculation units 504p, 504y, and 504r, and the parameters of the limit threshold values of the limit units 505p, 505y, and 505r described with reference to FIG. 5. Also, parameters of the tilt correction are parameters for the gain table 704 described with reference to FIGS. 7 and 9. The parameters are set so that each of a translation correction ratio, a roll correction ratio, and an RS distortion correction ratio in a translation direction/roll direction changes according to setting states of the shake correction and the tilt correction, that is, ON/OFF settings of the shake correction and the tilt correction shown in the above-mentioned Table 1.

Figures 20, 21:
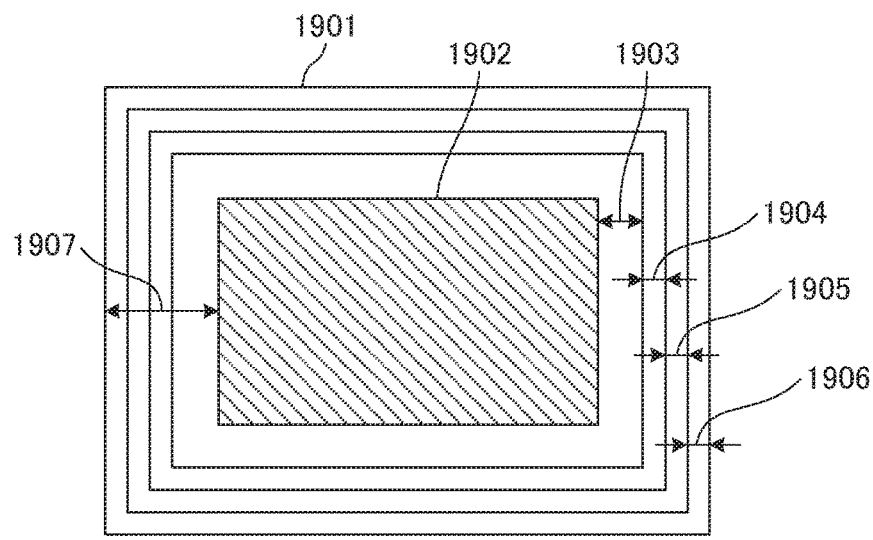
FIG. 20 is an explanatory diagram of a shutter speed setting at the time of the mode switching in the second embodiment.
FIG. 21 is an explanatory diagram of an image clipping correction range in electronic correction.

FIG. 21 is a diagram illustrating image clipping in electronic image-blur correction and each correction range. A process of clipping an original image 1901 to a size of an image 1902 is performed. A remaining surplus range 1907 after the clipping indicates an available range in electronic correction. As shown in the above-mentioned Table 1, each correction ratio changes according to settings of the shake correction and the tilt correction. For example, if the shake correction is set to be turned ON, the horizontal tilt correction is set to be turned ON, and the flapping tilt correction is set to be turned OFF (Table 1: first row-second column), a parameter is set to prioritize the roll correction and a roll correction ratio is maximized. A range 1903 of FIG. 21 is a translation correction range and a range 1904 is a roll correction range. A range 1905 is a translation RS distortion correction range and a range 1906 is a roll RS distortion correction range. Specifically, the translation correction range 1903 serves as a range corresponding to a value obtained by multiplying the surplus range 1907 by 4/14. A value of 14 of a denominator indicates a sum of correction ratios. The roll correction range 1904 serves as a range corresponding to a value obtained by multiplying a surplus range 1907 by 6/14. The translation RS distortion correction range 1905 and the roll RS distortion correction range 1906 serve as a range corresponding to a value obtained by multiplying the surplus range 1907 by 2/14. Parameters of the second calculation unit 218 and the first calculation unit 217 are set in accordance with the correction ranges obtained as described above.

Figure 13:
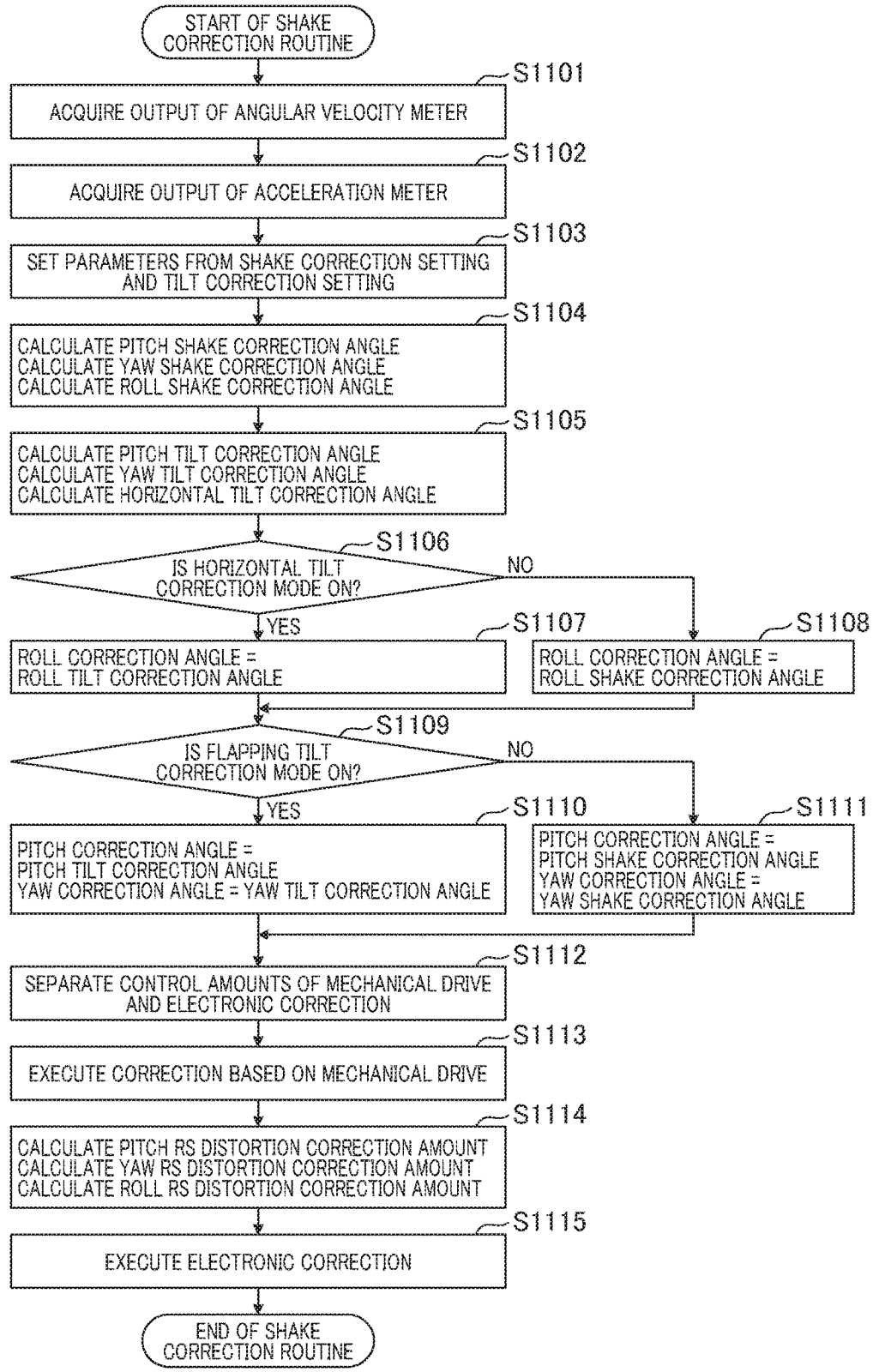
FIG. 13 is a flowchart illustrating a shake correction process in the first embodiment.

In S1104 of FIG. 13, shake correction angles in the pitch/yaw/roll directions are calculated from the parameters set in S1103 and the angular velocity output acquired in S1101. Each shake correction angle is calculated in the method described using FIG. 5. In S1105, tilt correction angles in the pitch/yaw/roll directions are calculated from the parameters set in S1103, the angular velocity output acquired in S1101, and the acceleration output acquired in S1102. Each tilt correction angle is calculated in the method described using FIGS. 7 and 9.

Next, S1106 is a process of determining a horizontal tilt correction mode. The control unit 215 determines ON or OFF of the horizontal tilt correction mode from the setting by the tilt correction designation unit 507 of the manipulation unit 212. The process proceeds to S1107 if the horizontal tilt correction mode is turned ON and the process proceeds to S1108 if the horizontal tilt correction mode is turned OFF. The correction switching unit 219 sets the roll correction angle to the roll tilt correction angle from the first calculation unit 217 in relation to the roll correction in S1107 and the process proceeds to S1109. Also, the correction switching unit 219 sets the roll correction angle to the roll shake correction angle from the second calculation unit 218 in relation to the roll correction in S1108 and the process proceeds to S1109.

S1109 is a process of determining a flapping tilt correction mode. The control unit 215 determines ON or OFF of the flapping tilt correction mode from the setting by the tilt correction designation unit 507 of the manipulation unit 212. The process proceeds to S1110 if the flapping tilt correction mode is turned ON and the process proceeds to S1111 if the flapping tilt correction mode is turned OFF. The correction switching unit 219 sets the pitch/yaw correction angle to the pitch/yaw tilt correction angle from the first calculation unit 217 in relation to the pitch/yaw correction in S1110 and the process proceeds to S1112. Also, the correction switching unit 219 sets the pitch/yaw correction angle to the pitch/yaw shake correction angle from the second calculation unit 218 in S1111 and the process proceeds to S1112. Here, the case in which the process proceeds to S112 is the case of the imaging apparatus having the electronic correction function and the optical correction function and the process is assumed to proceed to S1114 in the case of the imaging apparatus with only the electronic correction function.

In S1112, the control unit 215 separates an amount of control by the electronic correction and an amount of control by the optical correction. In the case of the imaging apparatus having the electronic correction function and the optical correction function, for example, the angle corrections in the pitch/yaw/roll directions include a correction performed in mechanical driving by the imaging device driving unit 401 of FIG. 4 and a correction in image processing by the image clipping setting unit 220 of FIG. 2. The control unit 215 separates amounts of corrections corresponding to correction angles in the pitch/yaw/roll directions. For example, if the correction angle is separated in HPF processing in which the cutoff frequency is set to be in the vicinity of 0.5 Hz, the correction by the optical correction mechanism unit is performed at a correction angle after the HPF process. The electronic correction is performed by the remaining amount of correction obtained by subtracting the correction angle after the HPF processing from the original correction angle. Alternatively, there is a method of setting a ratio of a correction range in relation to a movable range of the optical correction mechanism unit and a movable range in the electronic correction. In this case, each correction is executed according to a correction angle separated by multiplying the ratio by each correction angle. A distribution based on the ratio of the correction range is predetermined according to a specification or a photographing condition in the imaging apparatus and control is performed using both the optical correction and the electronic correction at an appropriate ratio.

The correction by the optical correction mechanism unit is executed in S1113 and the process proceeds to S1114. Amounts of RS distortion corrections in the pitch/yaw/roll directions are calculated on the basis of a signal obtained by subtracting an amount of correction by the optical correction from the shake of the camera as described with reference to FIG. 11 in S1114 and the process proceeds to S1115. In S1115, the electronic correction by image clipping is executed. The translation in the electronic correction and the roll correction are performed on the basis of the correction angles in the pitch/yaw/roll directions separated in S1112, and the RS distortion correction is performed on the basis of the amounts of RS distortion corrections in the pitch/yaw/roll directions calculated in S1114. Hereinafter, the correction process ends.

In the present embodiment, the parameters of the second calculation unit 218 and the first calculation unit 217 are set according to ON/OFF setting of the shake correction and ON/OFF setting of the tilt correction. According to the setting of the correction effect optionally designated by the user, ratios of the correction effect in the translation direction (the pitch/yaw direction), the correction effect in the roll direction, and the RS distortion correction effect in the translation/roll direction are changed and the shake correction and the tilt correction are performed. According to the present embodiment, it is possible to perform optimum shake and tilt corrections in relation to a user-desired photographing effect.

Second Embodiment

Next, the second embodiment of the present invention will be described. In the present embodiment, a selection unit configured to change a correction effect level of shake correction and a correction effect level of a tilt correction by a user's manipulation step by step is provided. Hereinafter, a configuration of an electronic correction unit based on imaging clipping will be described. Also, reference signs used above are used for configuration units of the present embodiment similar to those of the first embodiment, description thereof will be omitted, and differences will be mainly described. This omission of description is also the same as in embodiments to be described below.

FIG. 15 is an explanatory diagram of setting by the selection unit capable of being manipulated by the manipulation unit 212 and illustrates a setting screen example. The user can set the correction effect level if the setting of the shake correction is turned ON in addition to ON/OFF setting of the shake correction using a menu item of the shake correction in the setting screen. A selection indication for allowing the user to perform level setting of whether to prioritize the realism or the shake stop step by step is presented in the correction effect setting. For the shake correction effect, levels from a "Low" level to a "High" level can be set, the "Low" level corresponds to a realism priority mode, and the "High" level corresponds to a shake stop priority mode. For example, a scene of performing photographing while following a running person is assumed. If a dynamic video is captured while an object (the person) is followed, no dynamic video is obtained because the image blur is eliminated and a smooth moving image is obtained when the shake correction is excessively effective. Therefore, if the user selects the realism priority mode, control is performed so that the shake correction effect is low. When the camera shake occurs in photographing in the realism priority mode, a realistic video expression is obtained by performing correction for intentionally leaving an image blur.

Also, in the case of the shake stop mode, control is performed so that a shake correction effect in which an image blur is minimized is obtained. For example, on condition that a photographer wants to cleanly photograph a cityscape, a landscape, or the like during walking, a smooth moving-image is desired to be captured by eliminating a blur in the captured moving-image as much as possible. The mode suitable for this case is the shake stop priority mode.

The user can set ON/OFF setting of tilt correction in the horizontal direction and ON/OFF setting of a tilt correction in the flapping direction using a menu item of the tilt correction in the setting screen. If the tilt correction in the horizontal direction or the flapping direction is set to be turned ON, the user can set the tilt correction effect at levels from the "Low" level to the "High" level step by step using an effect setting menu. If the tilt correction effect is set to be "High," an angle at which maximum tilt correction is possible is increased and correction is performed so that a captured image is horizontally maintained even when a large tilt occurs. Also, if the tilt correction effect is set to be "Low," a maximum value of a correctable angle is set to be smaller than when the tilt correction effect is set to be "High." For example, the case in which the user performs photographing in a state in which his/her eyes are further away from a screen monitor of a camera during photographing or the case in which the user performs photographing while walking in a state in which his/her eyes are further away from the screen monitor of the camera is assumed. In this case, because the tilt of the camera normally increases, it is only necessary for the user to set the tilt correction effect to the "High" level. Also, because a large tilt is unlikely to occur if the user performs photographing while firmly confirming the monitor screen of the camera, it is only necessary to set the tilt correction effect to the "Low" level.

In the present embodiment, an example of mode switching in which each of the shake correction effect level and the tilt correction effect level can be set at levels of seven steps at the maximum will be described. Further, as an example in which a correction by image clipping as illustrated in FIG. 2 is performed, each correction process according to setting will be described.

FIG. 16 is an explanatory diagram for the shake correction setting, the level setting of the shake correction effect, the tilt correction setting, and the level setting of the tilt correction effect. As level setting examples of the shake correction effect and the tilt correction effect, parameter setting coefficients of translation corrections (pitch correction and yaw correction), roll correction, translation RS distortion correction, and roll RS distortion correction in the electronic correction are shown.

Coefficient values correspond to levels of seven steps, a coefficient value of 1 indicates a minimum correction effect, and a coefficient value of 7 indicates a maximum correction effect.

Figure 17:
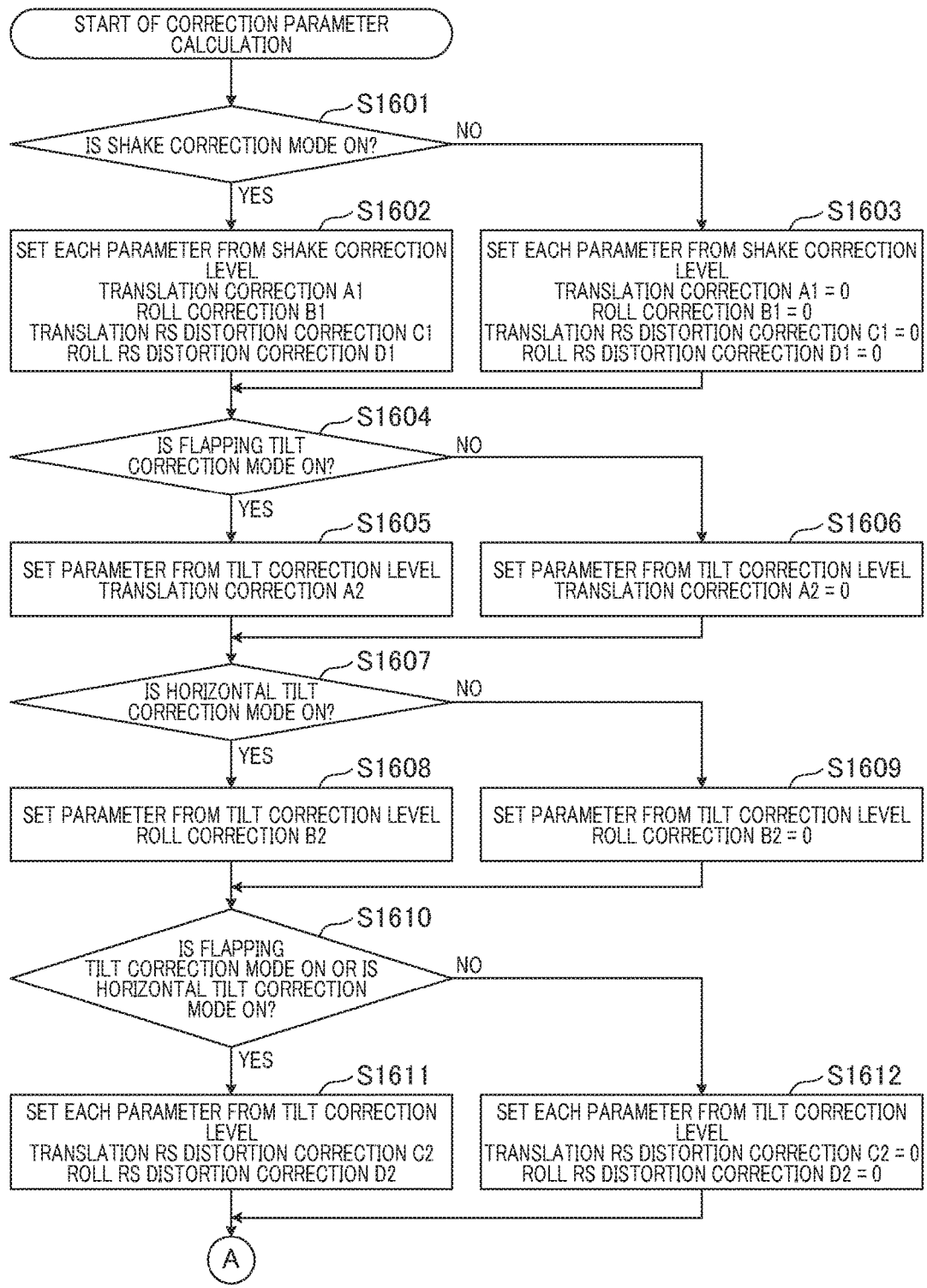
FIG. 17 is a flowchart illustrating a correction parameter calculation process in the second embodiment.
Figure 18:
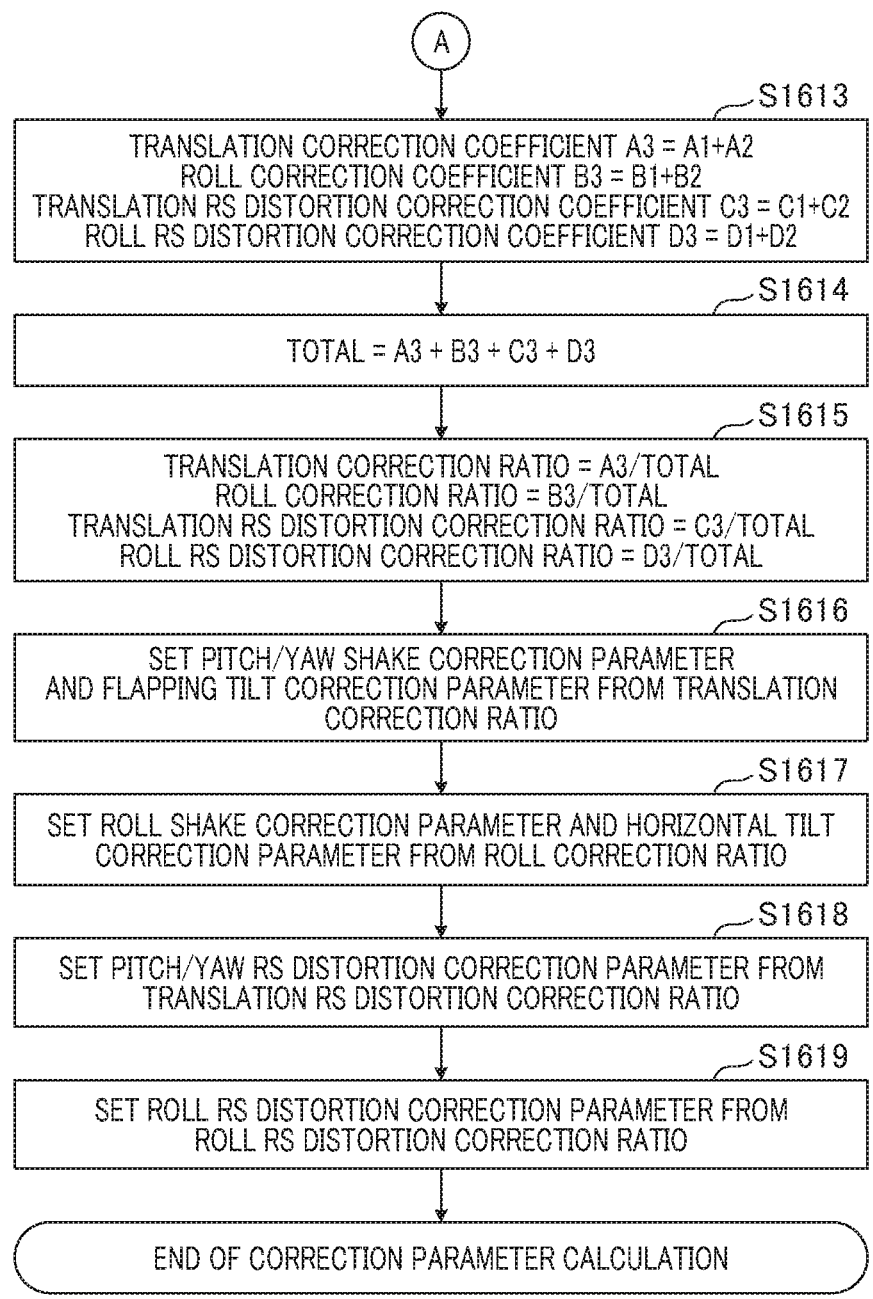
FIG. 18 is a flowchart illustrating a process subsequent to FIG. 17.

A process of calculating correction parameters will be described with reference to FIGS. 17 and 18. FIGS. 17 and 18 are flowcharts illustrating a flow of a process of calculating control parameters of the translation correction, the roll correction, the translation RS distortion correction, and the roll RS distortion correction on the basis of mode settings. The parameters set in S1103 of the flowchart described with reference to FIG. 13 are set according to the processes of the flowcharts of FIGS. 17 and 18.

In S1601, the control unit 215 makes a determination for ON/OFF setting of the shake correction mode. The process proceeds to S1602 if the shake correction mode is turned ON and the process proceeds to S1603 if the shake correction mode is turned OFF. In S1602, each parameter is set according to the level of the shake correction effect. Coefficients related to the translation correction, the roll correction, the translation RS distortion correction, and the roll RS distortion correction are assumed to be coefficients A1, B1, C1, and D1, respectively. In the example illustrated in FIG. 16, the level of the shake correction effect is set to be one step nearer to the shake stop priority side than the realism priority mode. Thus, 2 is set as values of the translation correction coefficient A1, the roll correction coefficient B1, the translation RS distortion correction coefficient C1, and the roll RS distortion correction coefficient D1. In S1603, all the coefficients A1, B1, C1, and D1 are set to zero. After setting processes of S1602 and S1603, the process proceeds to S1604.

In S1604, the control unit 215 makes a determination for ON/OFF setting of the flapping tilt correction mode of the tilt correction. The process proceeds to S1605 if the flapping tilt correction mode is turned ON and the process proceeds to S1606 if the flapping tilt correction mode is turned OFF. In S1605, a translation correction coefficient A2 is set according to the level of the tilt correction effect. In the example of FIG. 16, the level of the tilt correction effect is set to be one step lower than the "High" level. Thus, 6 is set as the value of the translation correction coefficient A2 and the process proceeds to the next S1607. The value of the translation correction coefficient A2 is set to zero in S1606 and the process proceeds to the next S1607.

In S1607, the control unit 215 makes a determination for ON/OFF setting of the horizontal tilt correction mode of the tilt correction. The process proceeds to S1608 if the horizontal tilt correction mode is turned ON and the process proceeds to S1609 if the horizontal tilt correction mode is turned OFF. In S1608, a roll correction coefficient B2 is set according to the level of the tilt correction effect. In the example of FIG. 16, the level of the tilt correction effect is set to be one step lower than the "High" level. Thus, 6 is set as the value of the roll correction coefficient B2 and the process proceeds to the next S1610. The value of the roll correction coefficient B2 is set to zero in S1609 and the process proceeds to the next S1610. In the present embodiment, a configuration example in which the level of the horizontal tilt correction effect is the same as the level of the flapping tilt correction effect as in FIG. 15 will be described. The present invention is not limited thereto, and the level of the horizontal tilt correction effect and the level of the flapping tilt correction effect may be configured to be differently set, and can be calculated as in the processes of FIGS. 17 and 18.

In S1610, the control unit 215 determines whether the flapping tilt correction mode of the tilt correction is turned ON or whether the horizontal tilt correction mode is turned ON. The process proceeds to S1611 if the flapping tilt correction mode or the horizontal tilt correction mode is turned ON and the process proceeds to S1612 if the flapping tilt correction mode and the horizontal tilt correction mode are turned OFF. In S1611, the values of the translation RS distortion correction coefficient C2 and the roll RS distortion correction coefficient D2 are set according to the level of the tilt correction effect. In the example of FIG. 16, the level of the tilt correction effect is set to be one step lower than the "High" level. Thus, 2 is set as the values of a coefficient C2 and a coefficient D2 and the process proceeds to S1613 of FIG. 18. Both the values of the coefficients C2 and D2 are set to zero in S1612 and the process proceeds to S1613 of FIG. 18.

In S1613 of FIG. 18, a translation correction coefficient A3, a roll correction coefficient B3, a translation RS distortion correction coefficient C3, and a roll RS distortion correction coefficient D3 are set on the basis of a relationship between the setting of the shake correction mode and the setting of the tilt correction mode so far. Specifically, an addition calculation is performed, a sum of the coefficients A1 and A2 is set as the coefficient A3, and a sum of the coefficients B1 and B2 is set as the coefficient B3. A sum of the coefficients C1 and C2 is set as the coefficient C3 and a sum of the coefficients D1 and D2 is set as the coefficient D3. In the example illustrated in FIG. 16, A3=8, B3=8, C3=4, and D3=4 are set and the process proceeds to the next S1614.

In S1614, the control unit 215 calculates a sum of the coefficients A3, B3, C3, and D3 and retains a calculation result as a total in a memory. In the example illustrated in FIG. 16, Total=24 is set. In S1615, a process of calculating the correction ratio by dividing each of the coefficients A3, B3, C3, and D3 of S1613 by the total of S1614 is executed. The control unit 215 calculates each of the translation correction ratio, the roll correction ratio, the translation RS distortion correction ratio, and the roll RS distortion correction ratio. In the example illustrated in FIG. 16, the ratios are as follows.

Translation correction ratio A3/Total=8/24.
Roll correction ratio B3/Total is 8/24.
Translation RS distortion correction ratio C3/Total=4/24.
Roll RS distortion correction ratio D3/Total=4/24.

Next, in S1616, a shake correction parameter and a tilt correction parameter are set on the basis of the translation correction ratio. The pitch shake correction parameter setting unit 508 and the yaw shake correction parameter setting unit 509 of FIG. 6 and the flapping tilt correction parameter setting unit 612 of FIG. 8 set parameters in accordance with a movable range from the translation correction ratio and the process proceeds to S1617. In S1617, the roll shake correction parameter and the horizontal tilt correction parameter are set on the basis of the roll correction ratio. The roll shake correction parameter setting unit 510 of FIG. 6 and the horizontal tilt correction parameter setting unit 611 of FIG. 8 set parameters in accordance with a movable range from the roll correction ratio. The process proceeds to S1618.

In S1618, pitch/yaw RS distortion correction parameters are set on the basis of the translation RS distortion correction ratio. The pitch RS distortion correction parameter setting unit 1007 and the yaw RS distortion correction parameter setting unit 1008 of FIG. 12 set parameters in accordance with a movable range from the translation RS distortion correction ratio, and the process proceeds to S1619. In S1619, the roll RS distortion correction parameter setting unit 1009 of FIG. 12 sets a parameter in accordance with a movable range from the roll RS distortion correction ratio. Then, a correction parameter calculation routine ends.

When the translation correction ratio, the roll correction ratio, the translation RS distortion correction ratio, and the roll RS distortion correction ratio are calculated, it is possible to set the parameters in accordance with the movable ranges of the corrections because maximum movable ranges of the corrections are determined from the correction ratios. As illustrated in FIG. 21, a range of an image 1902 is clipped for an original image 1901 and a remaining surplus range 1907 serves as an available range in the electronic correction. Here, each of a translation correction range 1903, a roll correction range 1904, a translation RS distortion correction range 1905, and a roll RS distortion correction range 1906 is set and each correction is performed within a set range.

In FIG. 16, if the shake stop priority mode is set in relation to the shake correction, the correction effect in the translation direction or the roll direction is set to be high. Also, if the realism priority mode is set, the correction effect in the translation direction or the roll direction is set to be low. If the "High" level is set in relation to the tilt correction effect, the correction effect in the translation direction or the roll direction is set to be high. If the "Low" level is set in relation to the tilt correction effect, the correction effect in the translation direction or the roll direction is set to be low. For example, if the tilt correction effect is set to be "High" in the shake stop priority mode, a correction ratio of the translation correction and the roll correction becomes 14/36 and a ratio of the translation RS distortion correction and the roll RS distortion correction becomes 4/36. Consequently, the effects of the translation and roll corrections are important more than the effect of the RS distortion correction and the correction range is allocated so that the substantially same correction effect is obtained in the corrections in the translation direction and the roll direction.

As another example, if the tilt correction effect is set to be "Low" in the realism priority mode, a correction ratio of the translation correction and the roll correction becomes 2/12 and a ratio of the translation RS distortion correction and the roll RS distortion correction becomes 4/12. Consequently, because a relatively reduced amount in the correction amounts of the translation and roll corrections is allocated to the correction range of the RS distortion correction, an RS distortion correction effect becomes important. In particular, in the case of setting of the realism priority mode, it is effective to increase the correction range of the RS distortion correction because an RS distortion also increases if the shake of the camera increases in many cases.

As still another example, the priority may be set at the just intermediate position between the realism priority and the shake stop priority in relation to the shake correction and the level of the tilt correction effect may be set at the just intermediate level between the "Low" level and the "High" level. In this case, the correction range is allocated so that an average effect is obtained in the translation and roll corrections and the RS distortion correction.

Next, a process of setting parameters in the second calculation unit 218 and the first calculation unit 217 based on calculated correction ratios of a translation/roll/translation RS distortion/roll RS distortion and a correction angle calculation will be described.

In FIG. 15, if the shake correction is set to be turned ON and the tilt correction is set to be turned OFF, the correction switching unit 219 selects an angle calculated by the second calculation unit 218, so that a correction is performed. Hereinafter, a method of calculating the correction angle of the second calculation unit 218 will be described in the present embodiment. As in the first embodiment, the shake correction angle is calculated as described with reference to FIG. 5. According to designations of the shake correction designation unit 506 and the tilt correction designation unit 507, pitch/yaw/roll shake correction parameters are set. The calculation is performed in accordance with the level of the shake correction effect. For example, if the realism priority mode is set in FIG. 16, the shake correction angle is calculated so that a correction remainder occurs. In the case of the realism priority mode, in the HPF units 501$p$, 501$y$, and 501$r$, the cutoff frequency is set to be high and the image-blur correction control band becomes narrow so that shake correction for a low-frequency component is not performed. In the angular velocity offset calculation units 504$p$, 504$y$, and 504$r$, an offset amount is set to be large. Large shake correction is limited and the calculation is performed so that the correction remainder appears. Also, for the limit units 505$p$, 505$y$, and 505$r$, the translation and roll correction ranges calculated on the basis of setting information in FIG. 16 are set and a limit threshold value is set to be small.

On the other hand, if the shake stop priority mode is set, the cutoff frequency is set to be low and the image-blur correction control band becomes wide so that shake correction for a low-frequency component is also performed in the HPF units 501$p$, 501$y$, and 501$r$. In the angular velocity offset calculation units 504$p$, 504$y$, and 504$r$, an offset amount is set to be small. The calculation is performed so that it is also possible to cope with large shake correction. Also, for the limit units 505$p$, 505$y$, and 505$r$, the translation and roll correction ranges calculated on the basis of the setting information in FIG. 16 are set and the limit threshold value is set to be large. Thus, in the case of the shake stop priority mode, the shake correction angle is calculated so that the correction remainder is eliminated as much as possible. The cutoff frequency of each HPF unit, the offset amount calculation parameter of the angular velocity offset calculation unit, the limit threshold value of the limit unit are set step by step in accordance with the level of the shake correction effect.

If the tilt correction is set to be turned ON in FIG. 15, the correction switching unit 219 selects an angle calculated by the first calculation unit 217 and the correction is performed. Hereinafter, a tilt correction angle calculation method in the first calculation unit 217 of the present embodiment will be described.

Figure 19:
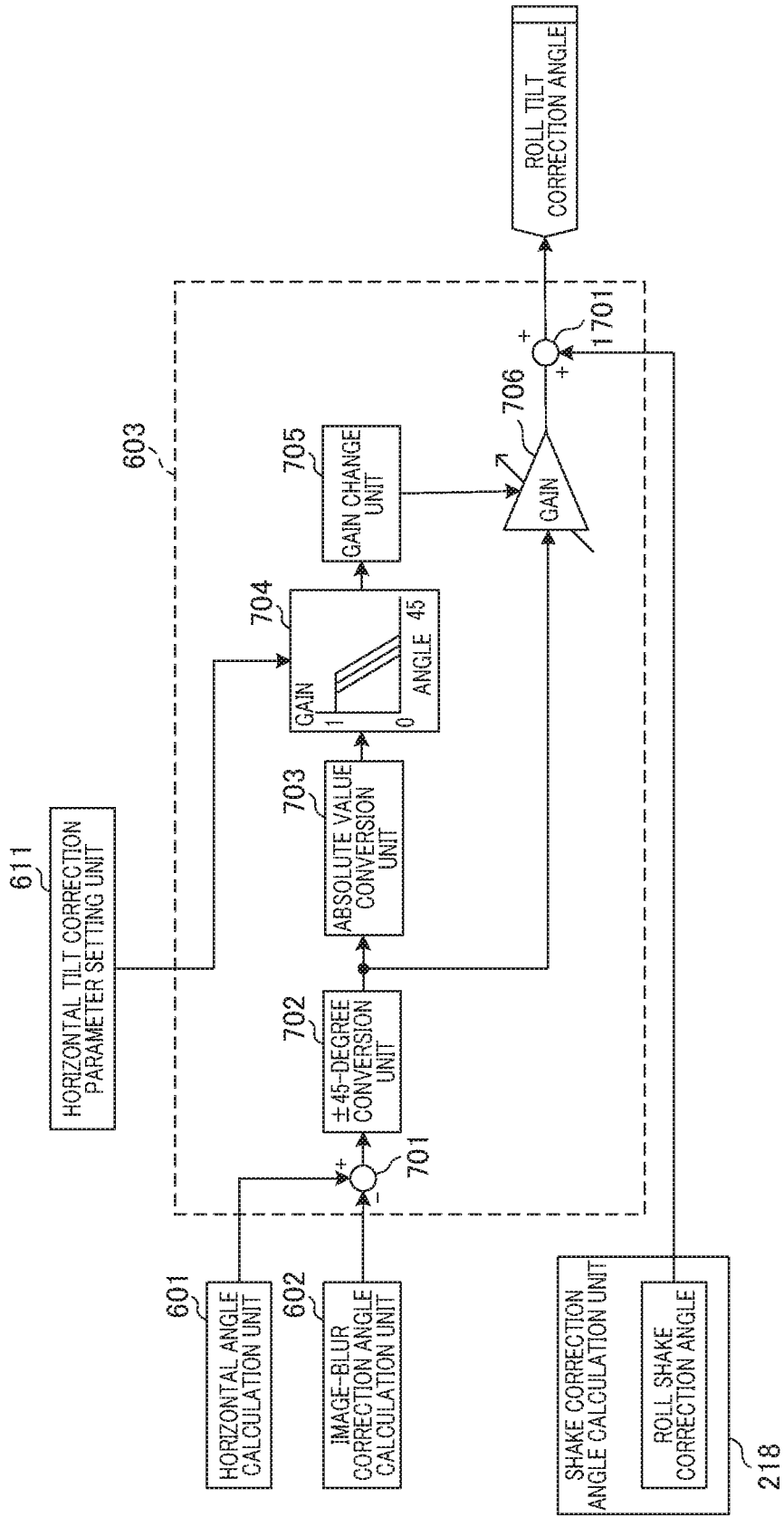
FIG. 19 is a block diagram illustrating a horizontal correction angle calculation unit of the second embodiment.

FIG. 19 is a block diagram illustrating a configuration example of the horizontal correction angle calculation unit 603. The present embodiment is different from the configuration described with reference to FIG. 9 in the first embodiment in that an adder 1701 is changed. The adder 1701 acquires and adds an output of a variable gain unit 706 and a roll shake correction angle calculated by a second calculation unit 218 and outputs a roll tilt correction angle which is an addition result.

The second calculation unit 218 calculates the roll shake correction angle in accordance with the level of the shake correction effect. If the realism priority mode is set in FIG. 16, the roll shake correction angle is calculated so that the correction remainder occurs as mentioned above. In this case, a low-frequency component is largely cut at the roll shake correction angle and only a high frequency is correctable.

A subtractor 701 subtracts an angle from an image-blur correction angle calculation unit 602 from a roll absolute angle from a horizontal angle calculation unit 601. The image-blur correction angle calculation unit 602 set to control a general image-blur correction control band outputs an angle at which a low-frequency component is removed. A variable gain unit 706 multiplies an output of a ±45-degree conversion unit 702 by a gain so that control is possible within a movable range and outputs a multiplication result. A signal output by a variable gain unit 706 serves as a tilt angle at which a high-frequency component is removed and becomes a signal of only a low-frequency tilt angle.

Also, a roll correction-specific movable range from the roll correction ratio which is an output of a horizontal tilt correction parameter setting unit 611 is input to a gain table 704 and angle threshold value 1 and angle threshold value 2 are set in accordance with the movable range. In the gain table 704, a gain value is set to 1 when an angle after absolute value conversion output by an absolute value conversion unit 703 is less than or equal to 1. Also, the gain value is set to zero when the angle after the absolute value conversion is greater than or equal to angle threshold value 2. When the angle after the absolute value conversion is between angle threshold value 1 and angle threshold value 2, the gain value is set according to a formula for performing a linear interpolation between gain values of 1 and 0. In this way, the roll tilt correction angle is calculated to be controlled in the roll correction-specific movable range.

The adder 1701 adds the tilt angle of only the low-frequency component which is the output of the variable gain unit 706 and the roll shake correction angle which is the output of the second calculation unit 218 and calculates a roll tilt correction angle. The correction of an extremely low-frequency tilt angle is performed and the roll shake correction angle limited at the high-frequency side for the shake correction is added. Consequently, even if the low-frequency tilt correction is effectuated, the realism is desired to appear, and the shake remainder is desired to occur, it is possible to limit the shake correction so that the realism appears with the tilt correction. According to this method, control is performed to cause a shake remainder which creates the realism while the low-frequency tilt correction is performed if the level of the tilt correction effect is set to be "High" and the level of the shake correction effect is set to prioritize the realism in FIG. 16. Also, if the level of the shake correction effect is set to prioritize the shake stop, it is possible to perform the tilt correction and the shake correction in a wide control band in a range from a low frequency to a high frequency. Also, the roll tilt correction angle calculation method has been described, but a calculation can be performed in a similar method even for flapping tilt correction angle calculations in the pitch direction and the yaw direction.

Also, in the case of control by only the electronic correction, it is desirable to control an amount of blur occurring within one frame image of a moving image by controlling a shutter speed value. A specific example will be described with reference to FIG. 20. FIG. 20 is an explanatory diagram illustrating a relationship between the level setting of the shake correction effect and the limit value of an exposure time corresponding to a shutter speed. The level setting can be performed from the realism priority to the shake stop priority step by step. If camera shake is large in the realism priority mode, a blur may be in one frame image because a dynamic video expression is obtained when the blur (an image flow due to shake) is within the one frame image of the moving image. Consequently, in the case of the realism priority mode, the control unit 215 changes exposure control to a low-speed side so that the shutter speed is slow. A parameter is set to increase the RS distortion correction effect when the translation/roll correction is not performed to prevent the RS distortion from occurring. Also, if the level setting of the shake correction effect is in the shake stop priority mode, the control unit 215 changes the exposure control to a high-speed side so that the shutter speed is fast because it is desirable that no blur be within one frame image.

In the present embodiment, an optimum translation correction, an optimum roll correction, and an optimum RS distortion correction are performed in relation to a photographer-desired video effect by changing levels of the shake correction effect and the tilt correction effect step by step according to a manipulation instruction of a photographer.

Third Embodiment

Next, the third embodiment of the present invention will be described. In the present embodiment, an imaging apparatus having a selection unit configured to change levels of a shake correction effect and a tilt correction effect step by step according to a manipulation instruction of a photographer and having a correction function of an optical correction mechanism unit and an electronic correction function of image processing will be described.

Figure 22:
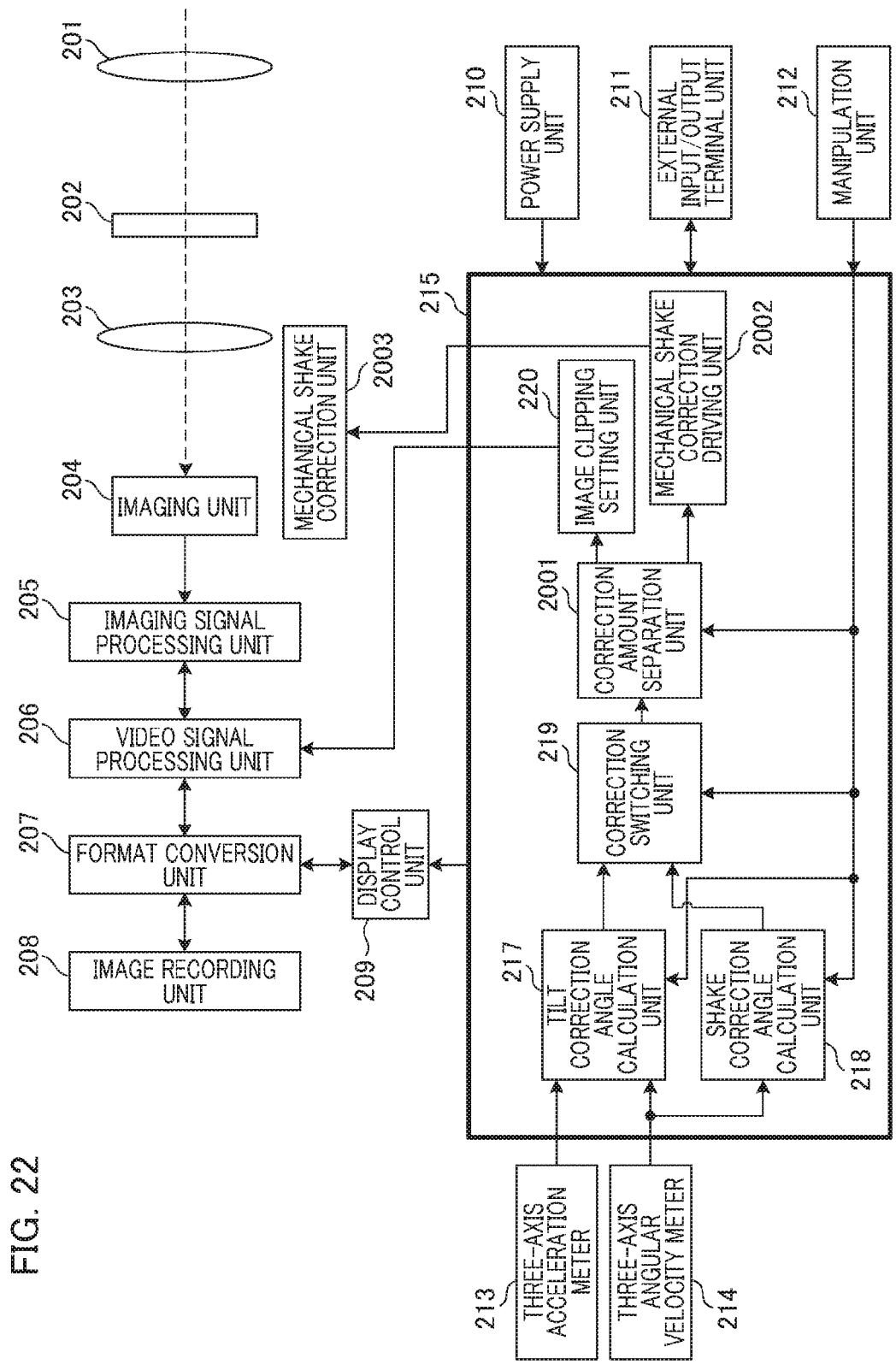
FIG. 22 is a block diagram illustrating a configuration of an imaging apparatus of a third embodiment.

FIG. 22 is a block diagram illustrating a configuration example of an imaging apparatus having a shake correction function and a tilt correction function in the present embodiment. A difference from the configuration illustrated in FIG. 2 is that an optical shake correction unit as illustrated in FIG. 4 is provided in addition to the electronic correction by image clipping. A correction amount separation unit 2001 acquires an output of the correction switching unit 219 to separate an amount of correction and outputs the separated correction amount to each of an image clipping setting unit 220 and a mechanical shake correction driving unit 2002. The mechanical shake correction driving unit 2002 performs an optical correction by driving a mechanical shake correction unit 2003. Also, the mechanical shake correction is correction based on the drive of the optical correction mechanism unit and is also referred to as a mechanical correction hereinafter.

FIG. 23A illustrates a relationship of a setting level amount of each mode when mode switching is performed and parameter setting coefficients of translation correction, roll correction, translation RS distortion correction, and roll RS distortion correction in electronic correction. In the parameter setting coefficients of the electronic correction illustrated in FIG. 23A, a parameter of the translation correction and a parameter of the roll correction are set to be smaller than those of the case of FIG. 16 described in the second embodiment. Specifically, if the realism priority mode is set in relation to the shake correction, parameters of the translation correction and the roll correction are set to be zero and allocations for the translation RS distortion correction and the roll RS distortion correction are set to increase.

FIG. 23B illustrates a relationship of a setting level amount of a shake correction effect and parameter setting coefficients of translation correction and roll correction in mechanical correction (optical correction). In the parameter setting of the mechanical correction, a coefficient value is set to be small if the realism priority mode is set in relation to the shake correction and a coefficient value is set to be large if the shake stop priority mode is set.

A shake correction angle and a tilt correction angle are calculated on the basis of the parameters of the correction effects set in FIGS. 23A and 23B and the shake correction and the tilt correction are performed. Hereinafter, correction angle calculation processes of a second calculation unit 218 and a first calculation unit 217 in the present embodiment will be described.

If the tilt correction is set to be turned OFF and the shake correction is set to be turned ON, the correction switching unit 219 selects an angle calculated by the second calculation unit 218, so that correction is performed. In this case, according to the level setting of the shake correction effect in FIG. 23A, correction ratios of the translation/roll/translation RS distortion/roll RS distortion correction are calculated and correction-specific movable ranges in the translation direction and the roll direction in the electronic correction are determined. Also, mechanical correction-specific movable ranges in the translation direction and the roll direction in mechanical correction are simultaneously determined by the level setting of the shake correction effect.

First, pitch/yaw/roll shake correction angles are calculated as in the method described in FIG. 5 in a movable range obtained by adding the movable range of the electronic correction and the movable range of the mechanical correction. The correction amount separation unit 2001 of FIG. 22 acquires a shake correction angle selected by the correction switching unit 219 and divides a signal from ratios of the movable ranges of the electronic correction and the mechanical correction. For example, the case in which the ratio of the electronic correction is set to 2 and the ratio of the mechanical correction is set to 3 is assumed. A calculation is performed so that a value of (Shake correction angle calculated by the second calculation unit 218)×2÷5 becomes an amount of correction in the electronic correction and a value of (Shake correction angle)×3÷5 becomes an amount of correction in the mechanical correction. As another method, an HPF in which a cutoff frequency is set in accordance with the ratios of the movable ranges of the electronic correction and the mechanical correction is used. HPF processing is performed on the shake correction angle, the mechanical correction is performed at a correction angle after the HPF processing, and the electronic correction is performed by a difference obtained by subtracting the amount of correction in the mechanical correction, that is, the remaining amount of correction, from the shake correction angle. In this method, it is possible to correct a high-frequency component in the mechanical correction and correct a low-frequency component in the electronic correction. It is possible to perform control using both the mechanical correction and the electronic correction in any method.

Next, the case in which the tilt correction is set to be turned ON will be described. In this case, the correction switching unit 219 selects an angle calculated by the first calculation unit 217, so that the correction is performed. This will be specifically described with reference to FIGS. 24A and 24B.

Figures 24A, 24B:
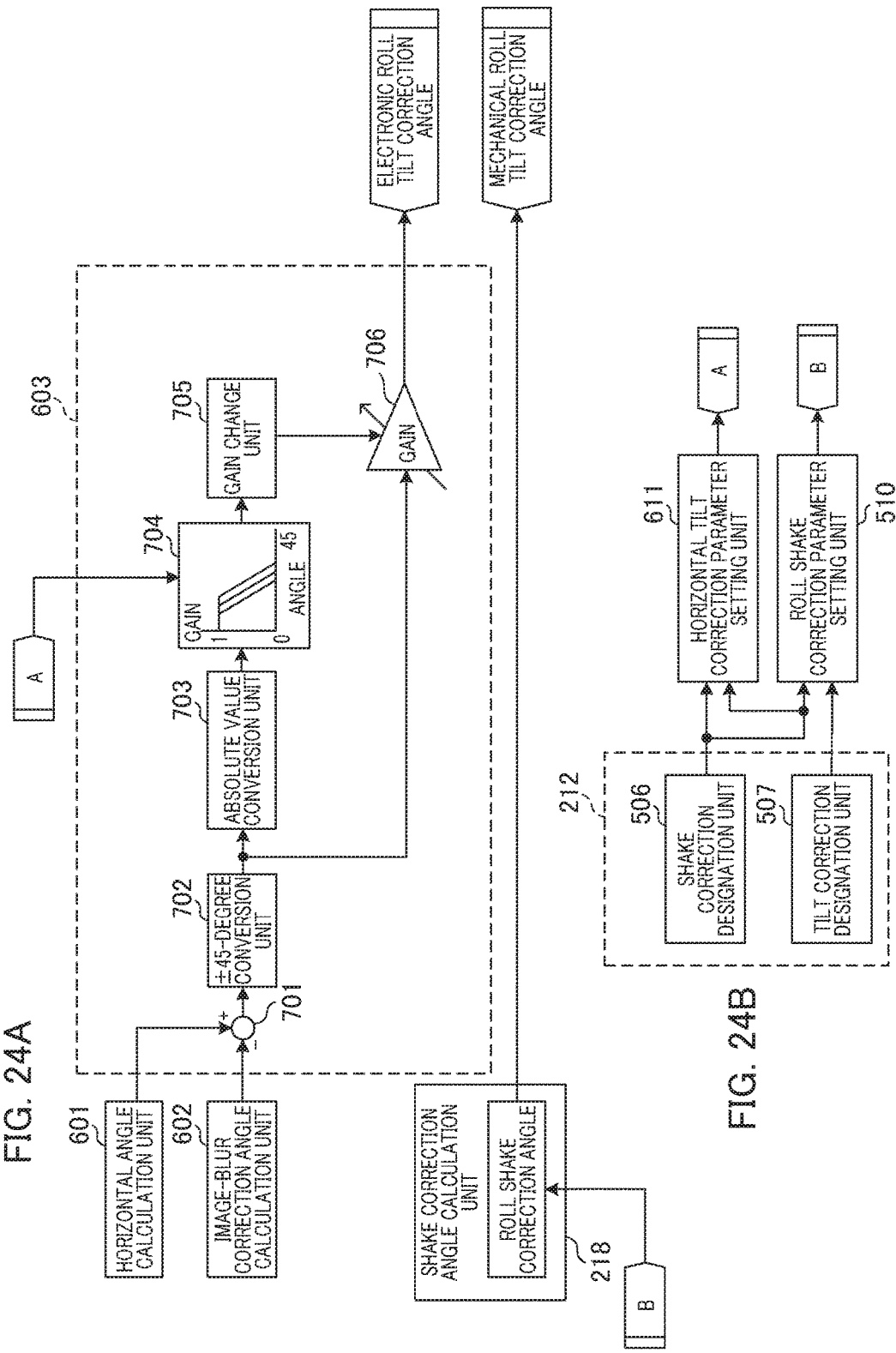
FIGS. 24A and 24B are block diagrams illustrating a horizontal correction angle calculation unit of the third embodiment.

FIGS. 24A and 24B are block diagrams related to a roll tilt angle calculation by a horizontal correction angle calculation unit 603 within the first calculation unit 217. In the present embodiment, the tilt correction is performed in the electronic correction and the shake correction is performed in the mechanical correction. The mechanical correction is performed on the basis of the shake angle from the shake correction angle calculation unit 218. According to the level setting of the shake correction effect illustrated in FIG. 23B for the shake angle, the correction angle is calculated using the parameter set by the roll shake correction parameter setting unit 510. In the case of the realism priority mode, the calculation is performed so that a correction remainder occurs by narrowing an image-blur correction control band and limiting a large shake correction. Also, in the case of the shake stop priority mode, the calculation is performed so that the shake is suppressed as much as possible by performing setting for widening the image-blur correction control range and performing the large shake correction.

Next, a method of calculating a tilt correction angle will be described.

As described using FIG. 19 in the second embodiment, an output of the variable gain unit 706 serves as a tilt angle at which a high-frequency component is removed and becomes a signal of only a low-frequency tilt angle. The output of the variable gain unit 706 becomes a roll tilt correction angle of the electronic correction. That is, an extremely low-frequency tilt angle is corrected by performing a tilt correction by the electronic correction. Also, the shake correction is performed from the mechanical correction on the basis of the shake correction angle limited at a high-frequency side for the shake correction. Even if the realism is desired to appear and the shake remainder is desired to occur while the low-frequency tilt correction is effectuated, it is possible to limit the shake correction while performing the tilt correction. Also, a roll correction-specific movable range from a roll correction ratio which is an output of a horizontal tilt correction parameter setting unit 611 is input to a gain table 704 and a calculation is performed so that a roll tilt correction angle is controlled within the roll correction-specific movable range. According to this method, it is possible to perform control for causing a shake remainder which creates the realism while performing the low-frequency tilt correction if the level of the tilt correction effect is set to be "High" and the level of the shake correction effect is set to prioritize the realism.

By the above method, if the tilt correction is set to be turned ON, a correction amount separation unit 2001 separates amounts of corrections by designating a tilt correction angle which is an output of the variable gain unit 706 as a first correction amount (an amount of electronic correction) and designating an output of the second calculation unit 218 as a second correction amount (an amount of mechanical correction). Although the roll tilt correction angle calculation method has been described in detail here, it is also possible to perform flapping tilt correction angle calculations in a pitch direction and a yaw direction in similar methods.

In relation to parameters of the electronic correction effects of FIG. 23A in the present embodiment, parameters of the shake correction effects in the translation/roll directions are set to be smaller than the parameters of the correction effects described in FIG. 16 in the case of the second embodiment (only the electronic correction). Also, the parameter of the RS distortion correction effect is set to be a value larger than the parameter of the correction effect described in FIG. 16. That is, because both the electronic correction and the mechanical correction are used in the present embodiment, ratios of translation/roll corrections correctable in the mechanical correction are set to be small. In relation to the RS distortion correction, the shake correction is performed by the mechanical correction before imaging. Thus, if the shake stop priority mode is set, an influence of an RS distortion is reduced because an amount of correction based on the mechanical correction is large as in FIGS. 23A and 23B. Also, if the realism priority mode is set, the RS distortion may appear because the correction effect of the mechanical correction is set to be small (so that a blur occurs in an imaging plane) as in FIGS. 23A and 23B. In this case, an effective video expression is given to express the realism in relation to shakes in the translation/roll directions, but it is desirable to eliminate the RS distortion as much as possible because an unnatural blurred image is given in relation to the RS distortion. Therefore, in the case of the realism priority, control is performed to increase a correction ratio of the RS distortion correction and improve the correction effect. Thereby, it is possible to acquire a realistic video which is not unnatural even in a photographed scene for which shake is large.

In the present embodiment, a selection unit configure to change level settings of the shake correction effect and the tilt correction effect by a user's manipulation step by step is provided and control using both the optical (mechanical) correction and the electronic correction is performed. Consequently, it is possible to perform a translation correction, a roll correction, and an RS distortion correction optimal for a photographer-desired video effect.

As described in the embodiments of the present invention, the present invention can be applied to an imaging apparatus capable of changing the correction effect of the shake correction or changing the correction effect of the tilt correction or an imaging apparatus capable of changing the correction effects of both the shake correction and the tilt correction. It is possible to implement a user-desired photographing effect by appropriately setting correction ratios for the correction in the translation direction, the correction in the roll direction, and the correction of the rolling distortion.

In the second and third embodiments of the present invention, a method of appropriately controlling the translation correction, the roll correction, the translation RS distortion correction, and the roll RS distortion correction if it is possible to change levels of the shake correction effect and the tilt correction effect step by step has been described. Even if the setting of the tilt correction or the level setting of the correction effect of the tilt correction are absent, it is possible to appropriately control the translation correction, the roll correction, the translation RS distortion correction, and the roll RS distortion correction according to a level of the shake correction effect. Specifically, this is the same as described as a control example of when the tilt correction is set to be turned OFF. Likewise, even if the setting of the shake correction or the level setting of the correction effect of the shake correction is absent, it is possible to appropriately control the translation correction, the roll correction, the translation RS distortion correction, and the roll RS distortion correction according to a level of the tilt correction effect. Specifically, this is the same as described as a control example of when the shake correction is set to be turned OFF. Also, an example in which the tilt correction is performed in the electronic correction and the shake correction is performed in the optical correction has been described, but the tilt correction may be performed in the optical correction and the shake correction may be performed in the electronic correction according to a specification, a condition, or the like.

Fourth Embodiment

Figure 25A:
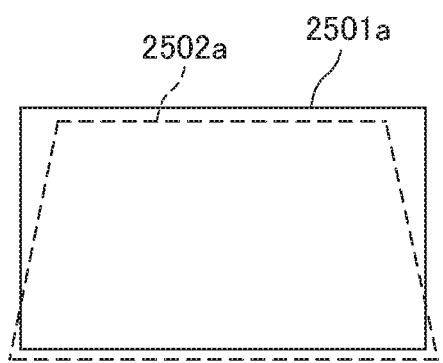
FIGS. 25A and 25B are diagrams illustrating trapezoidal distortion in a fourth embodiment.
Figure 25B:
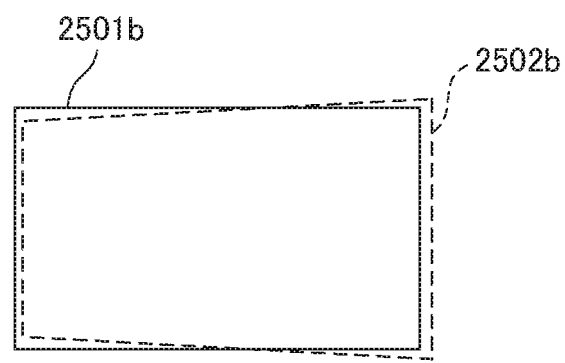

Next, the fourth embodiment of the present invention will be described. In the present embodiment, an imaging apparatus having an electronic correction function of correcting a trapezoidal distortion (FIG. 25) occurring due to the tilt of the camera by imaging processing in addition to roll rotation blur correction of an image (FIG. 3A) and translation blur correction (FIG. 3B) of an image will be described. Examples of trapezoidal distortions are illustrated in FIGS. 25A and 25B. FIG. 25A is an example of a trapezoidal distortion in a vertical direction, a captured image is denoted by reference sign 2501a, and a deformed image is denoted by reference sign 2502a. FIG. 25B is an example of a trapezoidal distortion in a horizontal direction, a captured image is denoted by reference sign 2501b, and a deformed image is denoted by reference sign 2502b.

Figure 26:
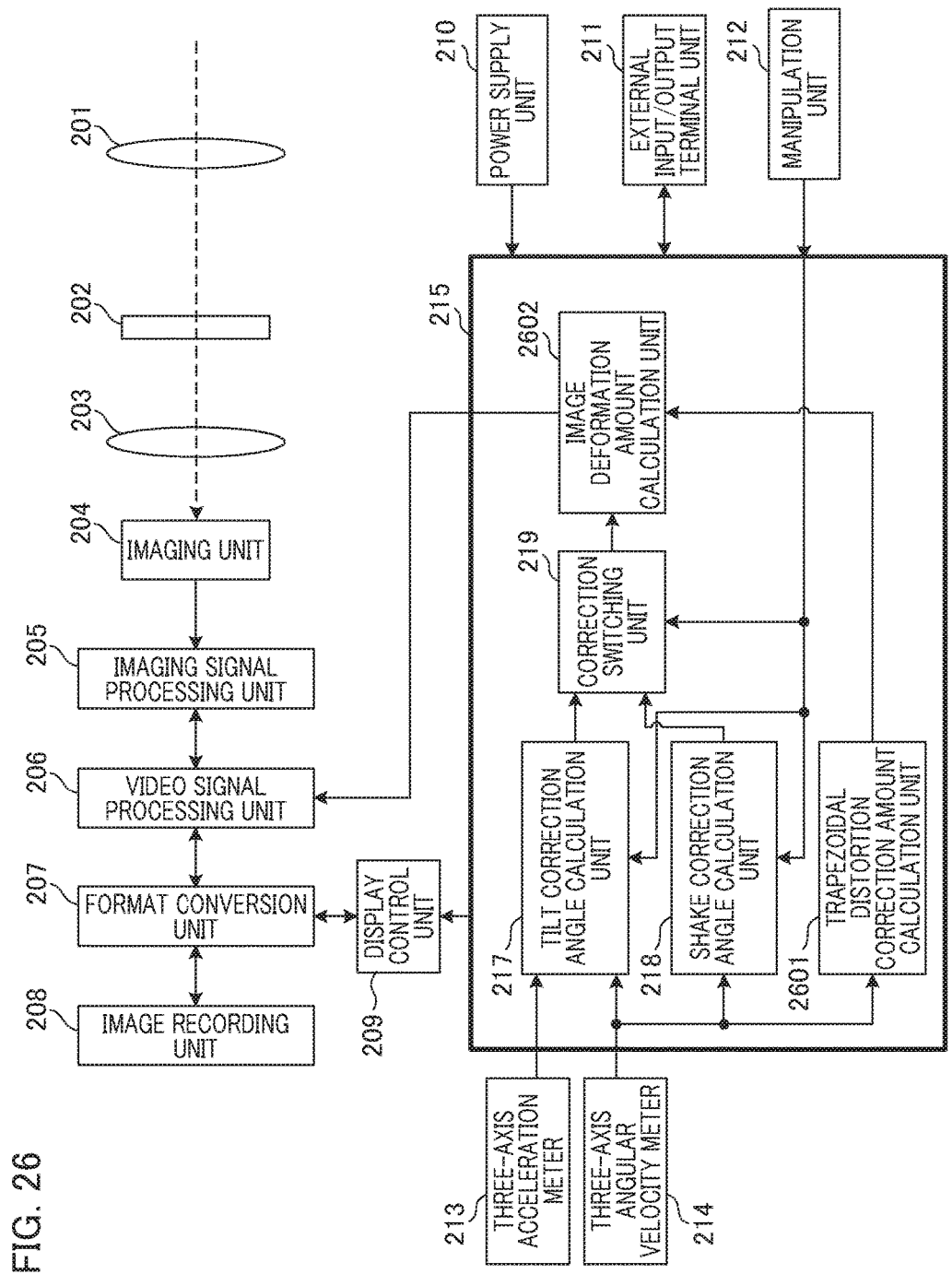
FIG. 26 is a block diagram illustrating a configuration example of an imaging apparatus of the fourth embodiment.

FIG. 26 is a block diagram illustrating a configuration of the imaging apparatus in the present embodiment. As compared with the block diagram of FIG. 2 of the first embodiment, a trapezoidal distortion correction amount calculation unit 2601 is added and the image clipping setting unit 220 of FIG. 2 is replaced with an image deformation amount calculation unit 2602.

An amount of translation shake correction and an amount of roll rotation shaker correction are output from a correction switching unit 219 in the method described in the first embodiment. A trapezoidal distortion correction amount is calculated by the trapezoidal distortion correction amount calculation unit 2601 and final electronic blur correction is calculated by an image deformation amount calculation unit 2602. A method of calculating an amount of correction will be described below in detail.

In an image deformation unit within a video signal processing unit 206, image deformation is performed using, for example, a geometric transformation such as a projective transformation. Specifically, when homogeneous coordinates can be represented by setting pixel coordinates of an image before deformation to (X0, Y0) (here, the center of the captured image corresponding to the optical axis of the imaging optical system is designated as the origin) and setting pixel coordinates of an image after the deformation to (X1, Y1), the homogeneous coordinates can be written as shown in Formula (2).

$$\begin{bmatrix} X1 \\ Y1 \\ 1 \end{bmatrix} \sim \begin{bmatrix} h1 & h2 & h3 \\ h4 & h5 & h6 \\ h7 & h8 & 1 \end{bmatrix} \begin{bmatrix} X0 \\ Y0 \\ 0 \end{bmatrix} \quad (2)$$

The left and right sides of Formula (2) indicate the equivalence relation (the meaning does not change even when the left side or the right side is multiplied by any ratio), and Formulas (3) and (4) are given in a normal equal sign.

$$X1 = \frac{h1X0 + h2Y0 + h3}{h7X0 + h8Y0 + 1} \quad (3)$$

$$X1 = \frac{h4X0 + h5Y0 + h6}{h7X0 + h8Y0 + 1} \quad (4)$$

Also, in Formula (2), a (3×3) matrix is generally referred to as a projective transformation matrix. The image deformation amount calculation unit 2602 sets elements h1 to h8 of the matrix. Also, although the image deformation will be described as using the projective transformation, for example, any deformation method such as an affine transformation may be used.

Next, details of a process to be performed by the image deformation amount calculation unit 2602 will be described. The image deformation amount calculation unit 2602 calculates an image deformation amount to be processed by the video signal processing unit 206 using a shake angle of the imaging apparatus and a focal length of the imaging optical system. Specifically, a projective transformation matrix of Formula (2) is calculated.

Here, a method of calculating the projective transformation matrix using the shake angle and the focal length of the imaging optical system will be described below.

Figure 27A:
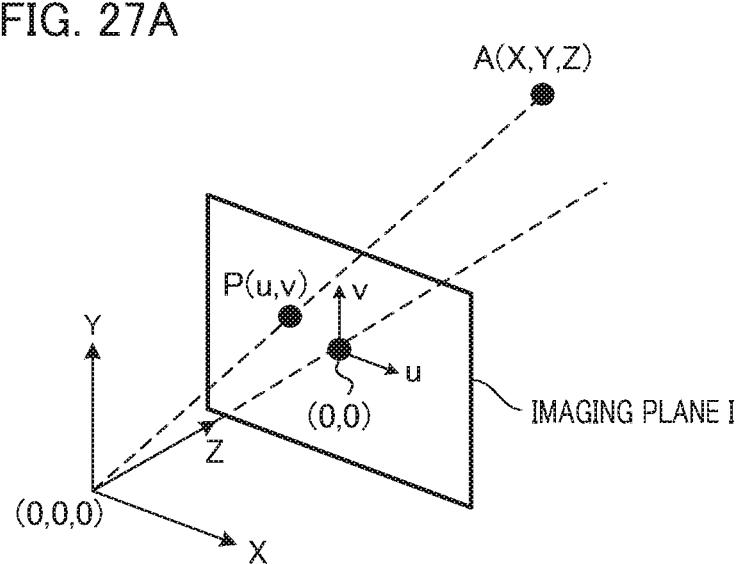
FIGS. 27A and 27B are diagrams illustrating pinhole camera models in the fourth embodiment.

FIG. 27A illustrates a projection into an imaging plane of an object by the imaging apparatus in a pinhole camera model. In FIG. 27A, the origin (0, 0, 0) of XYZ space coordinates is a pinhole position in the pinhole camera model. Because the image projected onto the imaging plane is inverted when the imaging plane is arranged to be nearer to a back side than the pinhole position, an imaging plane I is arranged before the pinhole position virtually in FIG. 27A so that an image is easy to be handled without being inverted.

A distance in a Z-axis direction between the origin (0, 0, 0) of the XYZ space coordinates and the imaging plane I becomes a focal length f. Coordinates on the imaging plane I are defined as uv plane coordinates and the origin (0, 0) of the uv plane coordinates is assumed to match (0, 0, f) in the XYZ space coordinates. Coordinates P(u, v) on the uv plane coordinates are coordinates when object A (X, Y, Z) on the XYZ space coordinates is projected onto the imaging plane I. At this time, the coordinates P can be expressed by Formula (5).

$$\begin{bmatrix} u \\ v \end{bmatrix} = \begin{bmatrix} f\frac{X}{Y} \\ f\frac{Y}{Z} \end{bmatrix} \quad (5)$$

Formula (5) can be expressed by Formula (6) when homogeneous coordinates are used.

$$\begin{bmatrix} u \\ v \\ 1 \end{bmatrix} \sim \begin{bmatrix} f & 0 & 0 & 0 \\ 0 & f & 0 & 0 \\ 0 & 0 & 1 & 0 \end{bmatrix} \begin{bmatrix} X \\ Y \\ Z \\ 1 \end{bmatrix} \quad (6)$$

Because elements of a fourth column of a (3×4) matrix of Formula (6) remain 0 in the description of the present invention, Formula (6) is Formula (7).

$$\begin{bmatrix} u \\ v \\ 1 \end{bmatrix} \sim \begin{bmatrix} f & 0 & 0 \\ 0 & f & 0 \\ 0 & 0 & 1 \end{bmatrix} \begin{bmatrix} X \\ Y \\ Z \end{bmatrix} \quad (7)$$

Figure 27B:
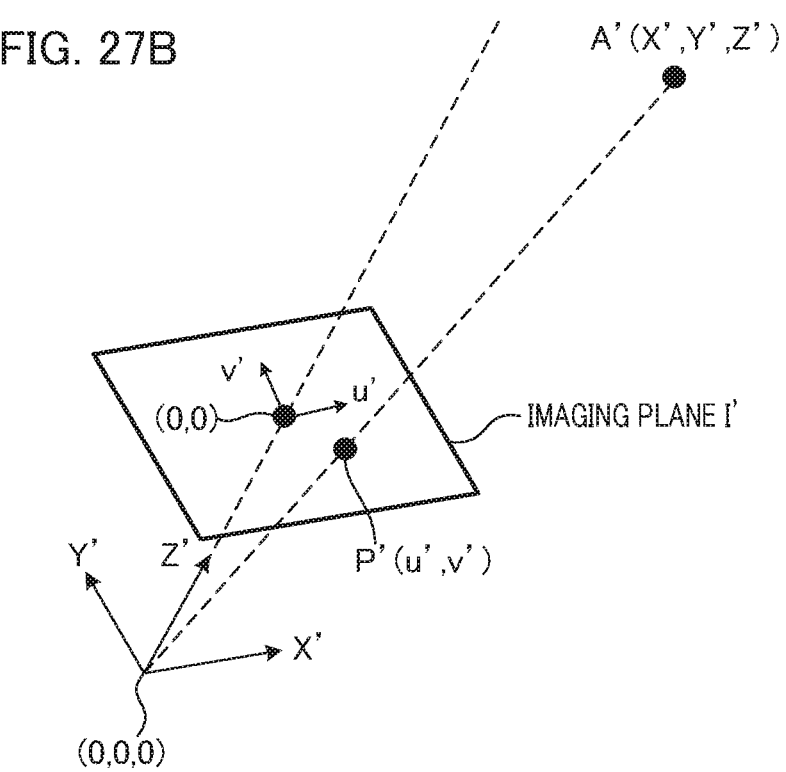

FIG. 27B illustrates the pinhole camera model of FIG. 27A at the time of R rotation. In FIG. 27B, coordinates obtained by the R rotation of the XYZ space coordinates of FIG. 27A are set as X'Y'Z' space coordinates. The origin (0, 0, 0) of the X'Y'Z' space coordinates is assumed to match that of the XYZ space coordinates. That is, FIG. 27B illustrates an expression in which a state in which rotation shake R occurs around a third direction which is a direction of an imaging optical axis in the imaging apparatus and parallel shake, which is parallel movement of an imaging apparatus, does not occur is simplified in the pinhole camera model.

In the pinhole camera model of FIG. 27B, an imaging plane I' is arranged at a position at which a distance from the origin (0, 0, 0) is a focal length f as in FIG. 27A. Coordinates on the imaging plane I' are defined as u'v' plane coordinates, the origin (0, 0) of the u'v' plane coordinates is assumed to match (0, 0, f) in the X'Y'Z' space coordinates. Coordinates P'(u', v') on the u'v' plane coordinates are coordinates when object A' (X', Y', Z') on the X'Y'Z' space coordinates is projected onto the imaging plane I'. Also, it is assumed that positions of object A of FIG. 27A and object A' of FIG. 27B in a world coordinate system are the same position (that is, the object does not move). At this time, coordinates P' can be expressed by Formula (8) similar to Formula (7) when homogeneous coordinates are used.

$$\begin{bmatrix} u' \\ v' \\ 1 \end{bmatrix} \sim \begin{bmatrix} f & 0 & 0 \\ 0 & f & 0 \\ 0 & 0 & 1 \end{bmatrix} \begin{bmatrix} X' \\ Y' \\ Z' \end{bmatrix} \quad (8)$$

Also, because positions of object A and object A' in the world coordinate system are the same, a relationship between the coordinates of the two positions can be expressed by Formula (9).

$$\begin{bmatrix} X' \\ Y' \\ Z' \end{bmatrix} = R \begin{bmatrix} X \\ Y \\ Z \end{bmatrix} \quad (9)$$

Further, it is possible to derive Formula (10) when Formula (7) and Formula (8) are deformed and substituted into Formula (9).

$$\begin{bmatrix} u' \\ v' \\ 1 \end{bmatrix} \sim \begin{bmatrix} f & 0 & 0 \\ 0 & f & 0 \\ 0 & 0 & 1 \end{bmatrix} R \begin{bmatrix} f & 0 & 0 \\ 0 & f & 0 \\ 0 & 0 & 1 \end{bmatrix}^{-1} \begin{bmatrix} u \\ y \\ 1 \end{bmatrix} \quad (10)$$

Formula (10) shows a correspondence relationship of positions of an object on the imaging plane before and after the pinhole camera is subjected to R rotation. That is, this becomes a formula indicating whether a pixel on the imaging plane moves from where to where when the shake of the R rotation is applied to the imaging apparatus. Consequently, it is only necessary to perform a transformation for restoring a pixel movement amount when the imaging apparatus is shaken to correct an image blur. That is, the R rotation is applied to the imaging apparatus according to Formula (11).

$$\begin{bmatrix} u \\ v \\ 1 \end{bmatrix} \sim \begin{bmatrix} f & 0 & 0 \\ 0 & f & 0 \\ 0 & 0 & 1 \end{bmatrix} R^{-1} \begin{bmatrix} f & 0 & 0 \\ 0 & f & 0 \\ 0 & 0 & 1 \end{bmatrix}^{-1} \begin{bmatrix} u' \\ y' \\ 1 \end{bmatrix} \quad (11)$$

Consequently, assuming that the shake applied to the imaging apparatus is denoted by R, a focal length of the imaging optical system is denoted by f, and a projective transmission matrix for performing image-blur correction is denoted by H, H is expressed by Formula (12).

$$H = \begin{bmatrix} f & 0 & 0 \\ 0 & f & 0 \\ 0 & 0 & 1 \end{bmatrix} R^{-1} \begin{bmatrix} f & 0 & 0 \\ 0 & f & 0 \\ 0 & 0 & 1 \end{bmatrix}^{-1} \quad (12)$$

Also, assuming that an angular shake amount in a YAW direction in shake around a first direction on a plane perpendicular to the optical axis applied to the imaging apparatus is denoted by $\theta_y$, an angular shake amount in a PITCH direction in shake around a second direction which is a direction perpendicular to the first direction on a plane perpendicular to the optical axis is denoted by $\theta_p$, and an angular shake amount in a ROLL direction is denoted by $\theta_r$, R can be expressed by Formula (13).

$$R = \begin{bmatrix} \cos\theta_y & 0 & -\sin\theta_y \\ 0 & 1 & 0 \\ \sin\theta_y & 0 & \cos\theta_y \end{bmatrix} \begin{bmatrix} 1 & 0 & 0 \\ 0 & \cos\theta_p & -\sin\theta_p \\ 0 & \sin\theta_p & \cos\theta_p \end{bmatrix} \begin{bmatrix} \cos\theta_r & -\sin\theta_r & 0 \\ \sin\theta_r & \cos\theta_r & 0 \\ 0 & 0 & 1 \end{bmatrix} \quad (13)$$

H of Formula (12) can be decomposed into deformation components of translation $\vec{t}$, scaling s (constant), rotation r (matrix), shearing k (matrix), and flapping $\vec{v}$ using Formulas (14).

$$H = \begin{bmatrix} sr & \vec{t} \\ \vec{0}' & 1 \end{bmatrix} \begin{bmatrix} k & \vec{0} \\ \vec{0}' & 1 \end{bmatrix} \begin{bmatrix} 1 & \vec{0} \\ \vec{v}' & 1 \end{bmatrix} \quad (14)$$

$$r = \begin{bmatrix} \cos\theta & -\sin\theta \\ \sin\theta & \cos\theta \end{bmatrix}, \vec{t} = \begin{bmatrix} t_x \\ t_y \end{bmatrix}, k = \begin{bmatrix} \alpha & \tan\phi \\ 0 & 1 \end{bmatrix}, \vec{v} = \begin{bmatrix} v_x \\ v_y \end{bmatrix},$$

$$I = \begin{bmatrix} 1 & 0 \\ 0 & 1 \end{bmatrix}, \vec{0} = \begin{bmatrix} 0 \\ 0 \end{bmatrix}$$

Here,
$t_x$: Horizontal translation amount
$t_y$: Vertical translation amount
$\theta$: Rotation angle
$v_x$: Horizontal flapping amount
$v_y$: Vertical flapping amount
$\alpha$: Anisotropic magnification of shearing
$\phi$: Direction angle of shearing When equations for deformation components are solved from Formulas (12), (13), and (14), Formulas (15) to (22) are given.

$$t_x = f(\tan\theta_y \cos\theta_r/\cos\theta_p + \tan\theta_p \sin\theta_r) \quad (15)$$

$$t_y = f(-\tan\theta_y \sin\theta_r/\cos\theta_p + \tan\theta_p \cos\theta_r) \quad (16)$$

$$\theta = -\theta_r \quad (17)$$

$$v_x = -\tan\theta_y/f \quad (18)$$

$$v_y = -\tan\theta_p/(f \cos\theta_y) \quad (19)$$

$$s = (\cos\theta_y \cos\theta_p)^{-3/2} \quad (20)$$

$$\alpha = (\cos\theta_p \cos\theta_y)^{1/2} \quad (21)$$

$$\tan\phi = \sin\theta_y \sin\theta_p/(\cos\theta_y \cos\theta_p)^{1/2} \quad (22)$$

Here, when a shake angle applied to the imaging apparatus is denoted by $\gamma$, $\cos\gamma=1$, $\sin\gamma \tan\gamma=0$, and $\sin\gamma \sin\gamma=0$ can be obtained by approximation if a value of $\gamma$ is not large and Formulas (15) to (21) can be expressed by Formulas (23) to (30).

$$t_x = f \tan\theta_y \quad (23)$$

$$t_y = f \tan\theta_p \quad (24)$$

$$\theta = -\theta_r \quad (25)$$

$$v_x = -\tan\theta_y/f \quad (26)$$

$$v_y = -\tan\theta/f \quad (27)$$

$$s = 1 \quad (28)$$

$$\alpha = 1 \quad (29)$$

$$\tan\phi = 0 \quad (30)$$

In the present embodiment, an operation based on an amount of correction calculated by the units up to the image deformation amount calculation unit 2602 will be specifically described. Also, translation direction movement in the horizontal direction and a trapezoidal distortion in the horizontal direction from Formulas (23) and (26) are caused by the angular shake in the yaw direction, translation direction movement in the vertical direction and a trapezoidal distortion in the vertical direction from Formulas (24) and (27) are caused by the angular shake in the pitch direction, and processes for the two shakes are the same.

Formulas (23) and (24) are calculated using the correction angles $\theta_y$ and $\theta_p$ calculated by the units up to the correction switching unit 219, Formula (25) is calculated using the roll correction angle $\theta_r$ calculated by the units up to the correction switching unit 219, and Formulas (26) and (27) are calculated by the trapezoidal distortion correction amount calculation unit 2601.

Also, in the present embodiment, image deformation is assumed to be performed without using components of shearing and scaling among deformation components of the image deformation. Thus, the components of shearing and scaling are not illustrated in the configuration of FIG. 26. However, a configuration for performing the image deformation for the components of shearing and scaling according to Formulas (20) to (22) or Formulas (28) to (30) may be provided.

Trapezoidal distortion correction amount calculation units in the vertical direction and the horizontal direction in the trapezoidal distortion correction calculation unit 2501 will be described with reference to FIGS. 28A and 28B. Detection signals from an angular velocity meter 214 are input to HPFs units 2801p and 2801y. p and y are symbols for identifying pitch and yaw, respectively. After a direct current (DC) component is cut in a corresponding HPF, the detection signals are input to subtractors 2802p and 2802y. The subtractors subtract outputs of angular velocity offset calculation units 2804p and 2804y from outputs after HPF processing and outputs signals after subtractions to integrators 2803p and 2803y. Outputs after integral processing by the integrators are sent to limit units 2805p and 2805y and the angular velocity offset calculation units 2804p and 2804y. The limit units 2805p and 2805y limit input values to values equal to or less than a predetermined value and calculate a vertical trapezoidal distortion correction amount and a horizontal trapezoidal distortion correction amount.

The angular velocity offset calculation units 2804p and 2804y calculate offset amounts on the basis of correction amounts in previous sampling (previous values of the vertical trapezoidal distortion correction amount and the horizontal trapezoidal distortion correction amount) and output the offset amounts to subtractors 2802p and 2802y. The angular velocity offset calculation unit sets an offset to zero if the shake angle is less than or equal to a threshold value A and sets an offset amount so that the offset amount increases according to a magnitude of a previous value of the amount of correction if the amount of correction is greater than the threshold value A.

A vertical trapezoidal distortion parameter setting unit 2808 and a horizontal trapezoidal distortion parameter setting unit 2809 set correction parameters of the vertical trapezoidal distortion parameter setting unit 2808 and the horizontal trapezoidal distortion parameter setting unit 2809 on the basis of designation information of the shake correction designation unit 506 and the tilt correction designation unit 507. The vertical trapezoidal distortion parameter setting unit 2808 and the horizontal trapezoidal distortion parameter setting unit 2809 manages correction parameters of axes and the correction parameters are set according to states of the shake correction designation unit 506 and the tilt correction designation unit 507. Vertical trapezoidal distortion correction parameters set by the vertical trapezoidal distortion parameter setting unit 2808 are input to the HPF unit 2801*p*, the angular velocity offset calculation units 2804*p*, and the limit unit 2805*p*. Horizontal trapezoidal distortion correction parameters set by the horizontal trapezoidal distortion parameter setting unit 2809 are input to the HPF unit 2801*y*, the angular velocity offset calculation units 2804*y*, and the limit unit 2805*y*.

If the correction effect decreases, parameters are set so that cutoff frequencies of the HPF units 2801*p* and 2801*y* are high and offset amounts of the angular velocity offset calculation units 2804*p* and 2804*y* are large. Parameters are set so that limit threshold values of the limit units 2805*p* and 2805*y* decrease. Also, if the correction effect increases, the parameters are set so that the cutoff frequencies of the HPF units 2801*p* and 2801*y* are low and the offset amounts of the angular velocity offset calculation units 2804*p* and 2804*y* are small. The parameters are set so that the limit threshold values of the limit units 2805*p* and 2805*y* increase. The parameters are set according to the correction ranges of the vertical trapezoidal distortion and the horizontal trapezoidal distortion.

In the above method, a vertical trapezoidal distortion correction amount and a horizontal trapezoidal distortion correction amount are calculated on the basis of settings of the shake correction setting unit 2806 and the tilt correction setting unit 2807.

A first row-fourth column of Table 2 indicates the case in which the setting by the shake correction designation unit 506 is ON and the setting by the tilt correction designation unit 507 is horizontal tilt correction ON and flapping tilt correction ON. In this case, correction ratios are set to be distributed so that equivalent effects are provided in directions of pitch, yaw, and roll. Also, because the effect of the tilt correction is intended to be higher than that of the trapezoidal distortion correction when the tilt correction is turned ON, the trapezoidal distortion correction effect decreases.

A first row-second column of Table 2 indicates the case in which the setting by the shake correction designation unit 506 is ON and the setting by the tilt correction designation unit 507 is horizontal tilt correction ON and flapping tilt correction OFF. In this case, the correction effect in the roll direction is set to be high and the correction effects in the pitch direction and the yaw direction are set to be relatively lower than that in the roll direction. Also, the roll correction is prioritized and the trapezoidal distortion correction effect is also set to be low.

A first row-third column of Table 2 indicates the case in which the setting by the shake correction designation unit 506 is ON and the setting by the tilt correction designation unit 507 is horizontal tilt correction OFF and flapping tilt correction ON. In this case, the correction effects in the pitch direction and the yaw direction are set to be high and the correction effect in the roll direction is set to be relatively lower than the correction effects in the pitch direction and the yaw direction. Also, the translation correction is prioritized and the trapezoidal distortion correction effect is also set to be low.

A second row-first column of Table 2 indicates the case in which the setting by the shake correction designation unit 506 is OFF and the setting by the tilt correction designation unit 507 is horizontal tilt correction OFF and flapping tilt correction OFF. The correction angles of the pitch, the yaw, and the roll are set to be zero and neither the shake correction nor the tilt correction is performed.

A second row-second column of Table 2 indicates the case in which the setting by the shake correction designation unit 506 is OFF and the setting by the tilt correction designation unit 507 is horizontal tilt correction ON and flapping tilt correction OFF. In this case, the correction ratio in the translation direction and the correction ratio in the trapezoidal distortion are zero and the parameter setting of the roll priority is given. A second row-third column of Table 2 indicates the case in which the setting by the shake correction designation unit 506 is OFF and the setting by the tilt correction designation unit 507 is horizontal tilt correction OFF and flapping tilt correction ON.

In this case, the correction ratio in the roll direction and the correction ratio of the trapezoidal distortion are zero and the parameter setting of the translation priority is provided. A second row-fourth column of Table 2 indicates the case in which the setting by the shake correction designation unit 506 is OFF and the setting by the tilt correction designation unit 507 is horizontal tilt correction ON and flapping tilt correction ON. In this case, correction ratios are set to be distributed so that equivalent effects are provided in the directions of the pitch, the yaw, and the roll, and the correction ratio of the trapezoidal distortion is set to zero because the shake correction is turned OFF.

TABLE 2

|  | Horizontal tilt correction OFF<br>Flapping tilt correction OFF | Horizontal tilt correction ON<br>Flapping tilt correction OFF | Horizontal tilt correction OFF<br>Flapping tilt correction ON | Horizontal tilt correction ON<br>Flapping tilt correction ON |
|---|---|---|---|---|
| Shake correction ON | ■Translation priority parameter<br>Translation correction ratio 5<br>Roll correction ratio 3<br>Trapezoidal distortion correction ratio 4 | ■Roll priority parameter<br>Translation correction ratio 3<br>Roll correction ratio 7<br>Trapezoidal distortion correction ratio 2 | ■Translation priority parameter<br>Translation correction ratio 7<br>Roll correction ratio 3<br>Trapezoidal distortion correction ratio 2 | ■Average parameter<br>Translation correction ratio 6<br>Roll correction ratio 5<br>Trapezoidal distortion correction ratio 2 |
| Shake correction OFF | ■No correction<br>Translation correction ratio 0<br>Roll correction ratio 0<br>Trapezoidal distortion correction ratio 0 | ■Roll priority parameter<br>Translation correction ratio 0<br>Roll correction ratio 12<br>Trapezoidal distortion correction ratio 0 | ■Translation priority parameter<br>Translation correction ratio 12<br>Roll correction ratio 0<br>Trapezoidal distortion correction ratio 0 | ■Average parameter<br>Translation correction ratio 6<br>Roll correction ratio 6<br>Trapezoidal distortion correction ratio 0 |

506 is ON and the setting by the tilt correction designation unit 507 is horizontal tilt correction ON and flapping tilt In the present embodiment, the parameters of the translation correction, the roll correction, and the trapezoidal distortion correction are set according to ON/OFF setting of the shake correction and ON/OFF setting of the tilt correction. According to the setting of the correction effect optionally designated by the user, ratios of the correction effect in the translation direction (the pitch/yaw direction), the correction effect in the roll direction, and the trapezoidal distortion correction (vertical/horizontal) effect are changed and the shake correction and the tilt correction are performed. According to the present embodiment, it is possible to perform optimum shake and tilt corrections in relation to a user-desired photographing effect.

Also, even if a selection unit configured to change a correction effect level of a shake correction and a correction effect level of a tilt correction by a user's manipulation is provided, it is possible to perform optimum shake and tilt corrections in relation to a user-desired photographing effect by setting parameters of the translation correction, the roll correction, and the trapezoidal distortion correction according to the effect levels.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-181487, filed Sep. 15 2015, and Japanese Patent Application No. 2016-128844, filed Jun. 29 2016, which are hereby incorporated by reference wherein in its entirety.

What is claimed is:

1. A tilt correction apparatus comprising:
a designation unit configured to designate a level of an effect of first tilt correction of an imaging apparatus having an optical axis as a rotary axis and a level of an effect of second tilt correction of the imaging apparatus having an axis orthogonal to the optical axis as a rotary axis;
an electronic correction unit configured to execute at least one of the first tilt correction and the second tilt correction by moving an image clipping range set within an imaging screen; and
a control unit configured to vary a ratio of a first tilt-correctable range and a ratio of a second tilt-correctable range in an electronic correction according to the level of the effect of the first tilt correction and the level of the effect of the second tilt correction,
wherein each unit is implemented by one or more processors, circuitry, or a combination thereof.

2. The tilt correction apparatus according to claim 1, wherein the first tilt-correctable range is a roll-correctable range, and
wherein the second tilt-correctable range is a translation-correctable range.

3. The tilt correction apparatus according to claim 2, wherein the control unit varies the ratio of the roll-correctable range and the ratio of the translation-correctable range in the electronic correction according to a level of an effect of image blur correction, the level of the effect of the first tilt correction, and the level of the effect of the second tilt correction.

4. The tilt correction apparatus according to claim 3, wherein the control unit varies the ratio of the roll-correctable range, the ratio of the translation-correctable range, and a ratio of a rolling-shutter-distortion-correctable range in the electronic correction according to the level of the effect of the image blur correction, the level of the effect of the first tilt correction, and the level of the effect of the second tilt correction.

5. The tilt correction apparatus according to claim 4, wherein the control unit varies a ratio of a translation-rolling-shutter-distortion-correctable range and a ratio of a roll-rolling-shutter-distortion-correctable range according to the level of the effect of the image blur correction, the level of the effect of the first tilt correction, and the level of the effect of the second tilt correction.

6. An image-blur correction apparatus comprising:
a designation unit configured to designate a level of an effect of image-blur correction and a level of an effect of first tilt correction of an imaging apparatus having an optical axis as a rotary axis;
an electronic correction unit configured to execute at least one of the image-blur correction and the first tilt correction by moving an image clipping range set within an imaging screen; and
a control unit configured to vary a ratio of an image-blur-correctable range and a ratio of a first tilt-correctable range in an electronic correction according to the level of the effect of the image-blur correction and the level of the effect of the first tilt correction,
wherein each unit is implemented by one or more processors, circuitry, or a combination thereof.

7. The image-blur correction apparatus according to claim 6,
wherein the image-blur-correctable range is a translation-correctable range, and
wherein the first tilt-correctable range is a roll-correctable range.

8. The image-blur correction apparatus according to claim 7, wherein the control unit varies a ratio of the translation-correctable range and a ratio of the roll-correctable range in the electronic correction according to the level of the effect of the image-blur correction, the level of the effect of the first tilt correction, and a level of an effect of second tilt correction of the imaging apparatus having an axis orthogonal to the optical axis as a rotary axis.

9. The image-blur correction apparatus according to claim 8, wherein the control unit varies the ratio of the translation-correctable range, the ratio of the roll-correctable range, and a ratio of a rolling-shutter-distortion-correctable range in the electronic correction according to the level of the effect of the image-blur correction, the level of the effect of the first tilt correction, and the level of the effect of the second tilt correction.

10. The image-blur correction apparatus according to claim 9, wherein the control unit varies a ratio of a translation-rolling-shutter-distortion-correctable range and a ratio of a roll-rolling-shutter-distortion-correctable range according to the level of the effect of the image-blur correction, the level of the effect of the first tilt correction, and the level of the effect of the second tilt correction.

11. A method of controlling a tilt correction apparatus, the method comprising:

designating a level of an effect of first tilt correction of an imaging apparatus having an optical axis as a rotary axis and a level of an effect of second tilt correction of the imaging apparatus having an axis orthogonal to the optical axis as a rotary axis in a manipulation process;

executing at least one of the first tilt correction and the second tilt correction by moving an image clipping range set within an imaging screen in an electronic correction process; and varying a ratio of a first tilt-correctable range and a ratio of a second tilt-correctable range in the electronic correction process according to the level of the effect of the first tilt correction and the level of the effect of the second tilt correction in a calculation process.

12. A method of controlling an image-blur correction apparatus, the method comprising:

designating a level of an effect of image-blur correction and a level of an effect of first tilt correction of an imaging apparatus having an optical axis as a rotary axis in a manipulation process;

executing at least one of the image-blur correction and the first tilt correction by moving an image clipping range set within an imaging screen in an electronic correction process; and varying a ratio of an image-blur-correctable range and a ratio of a first tilt-correctable range in the electronic correction process according to the level of the effect of the image-blur correction and the level of the effect of the first tilt correction in a calculation process.

* * * * *